June 28, 1960  L. C. PEARCE  2,942,532
APPARATUS FOR FORMING AND AFFIXING A DIVIDER IN A BOX
Filed Aug. 9, 1956  13 Sheets-Sheet 1

INVENTOR.
Lewis C. Pearce
BY
Hyde, Meyer, Baldwin & Doran
Attorneys

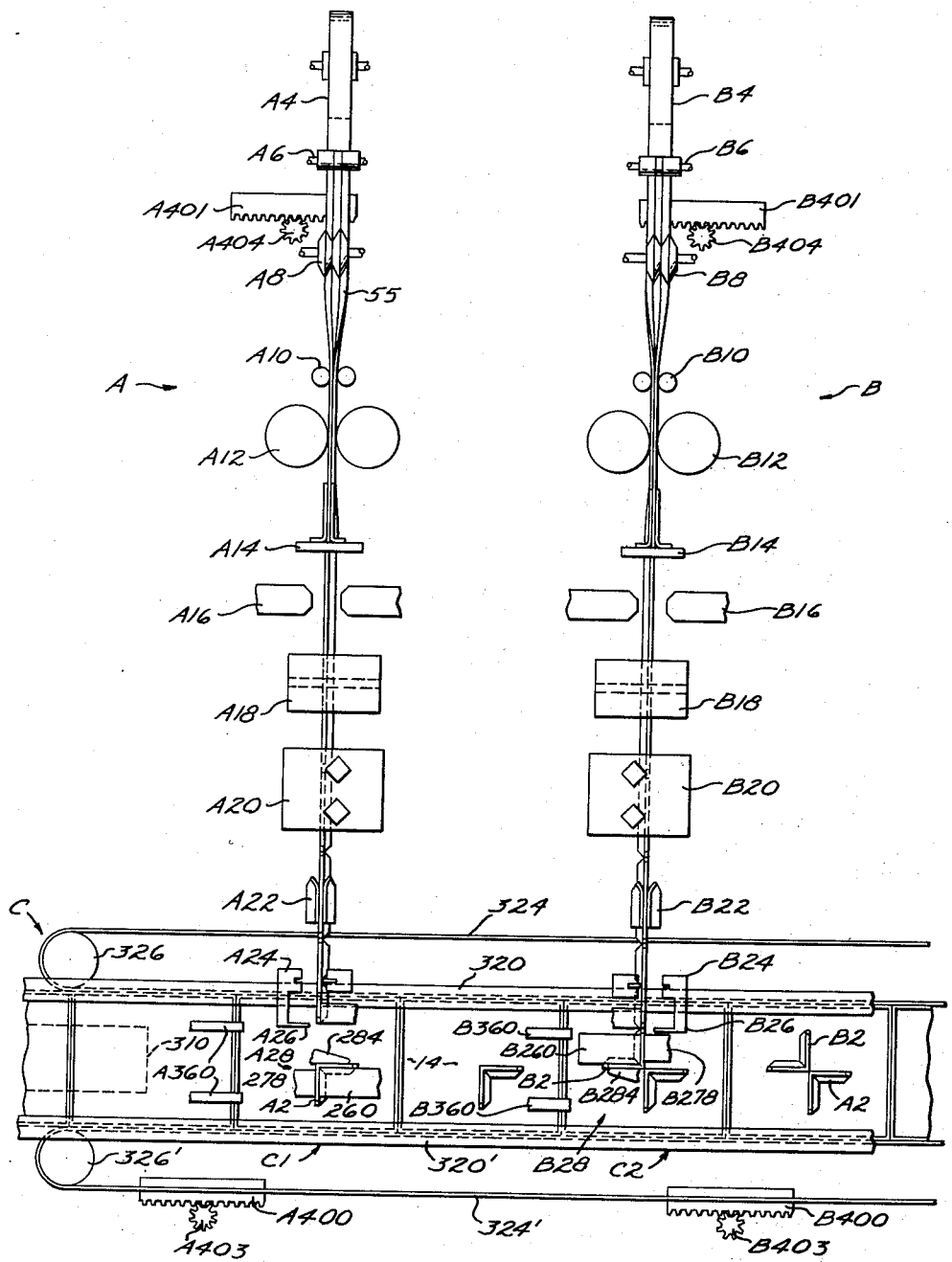

June 28, 1960
L. C. PEARCE
2,942,532
APPARATUS FOR FORMING AND AFFIXING A DIVIDER IN A BOX
Filed Aug. 9, 1956
13 Sheets-Sheet 3
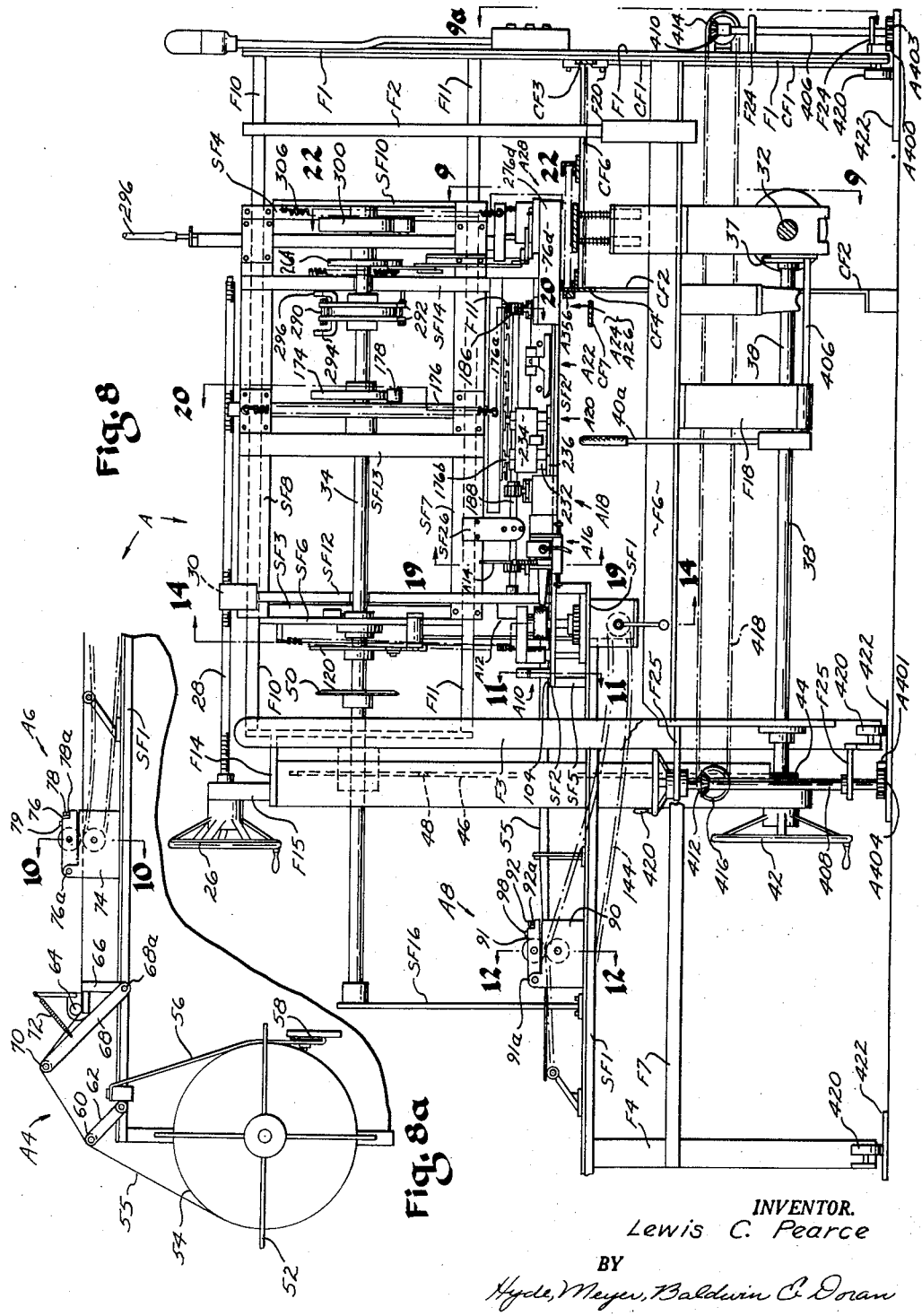
INVENTOR.
Lewis C. Pearce
BY
Hyde, Meyer, Baldwin & Doran
Attorneys

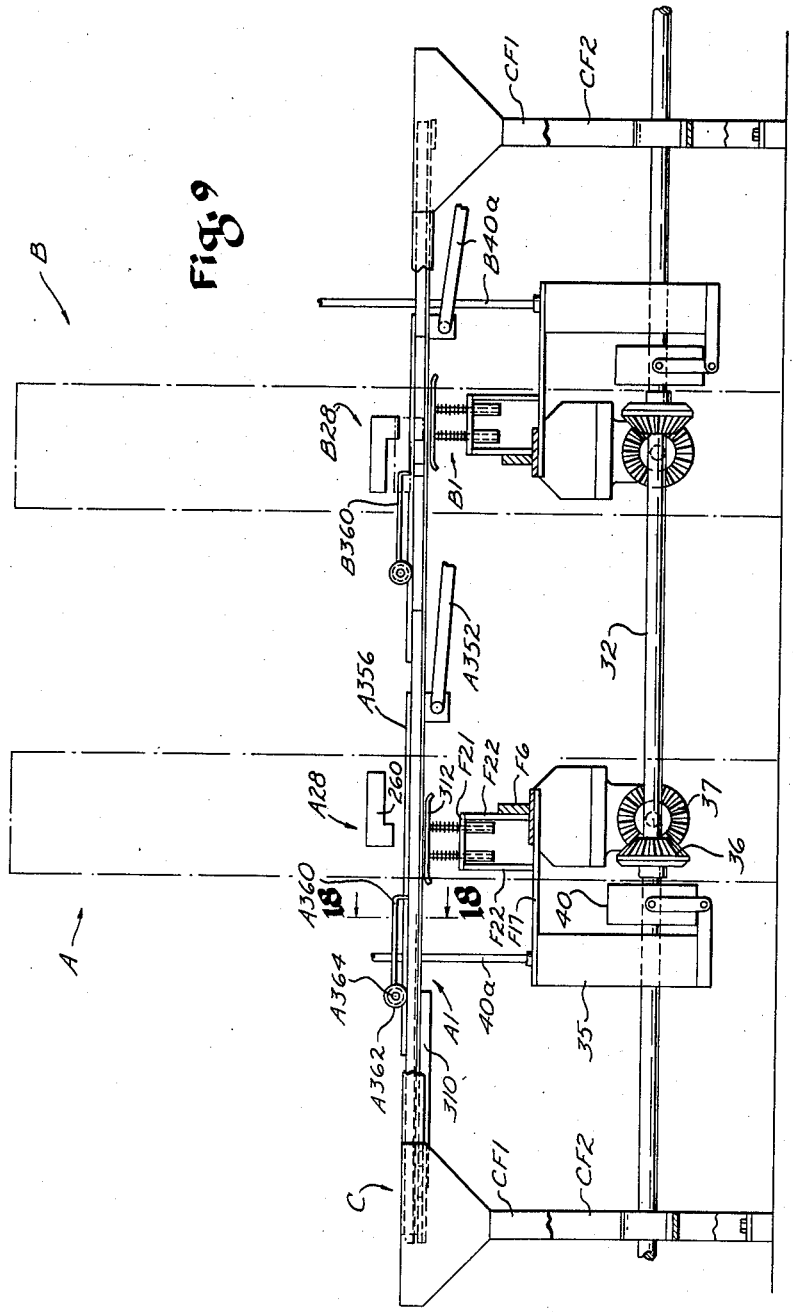

INVENTOR.
Lewis C. Pearce
BY
Hyde, Meyer, Baldwin & Doan
Attorneys

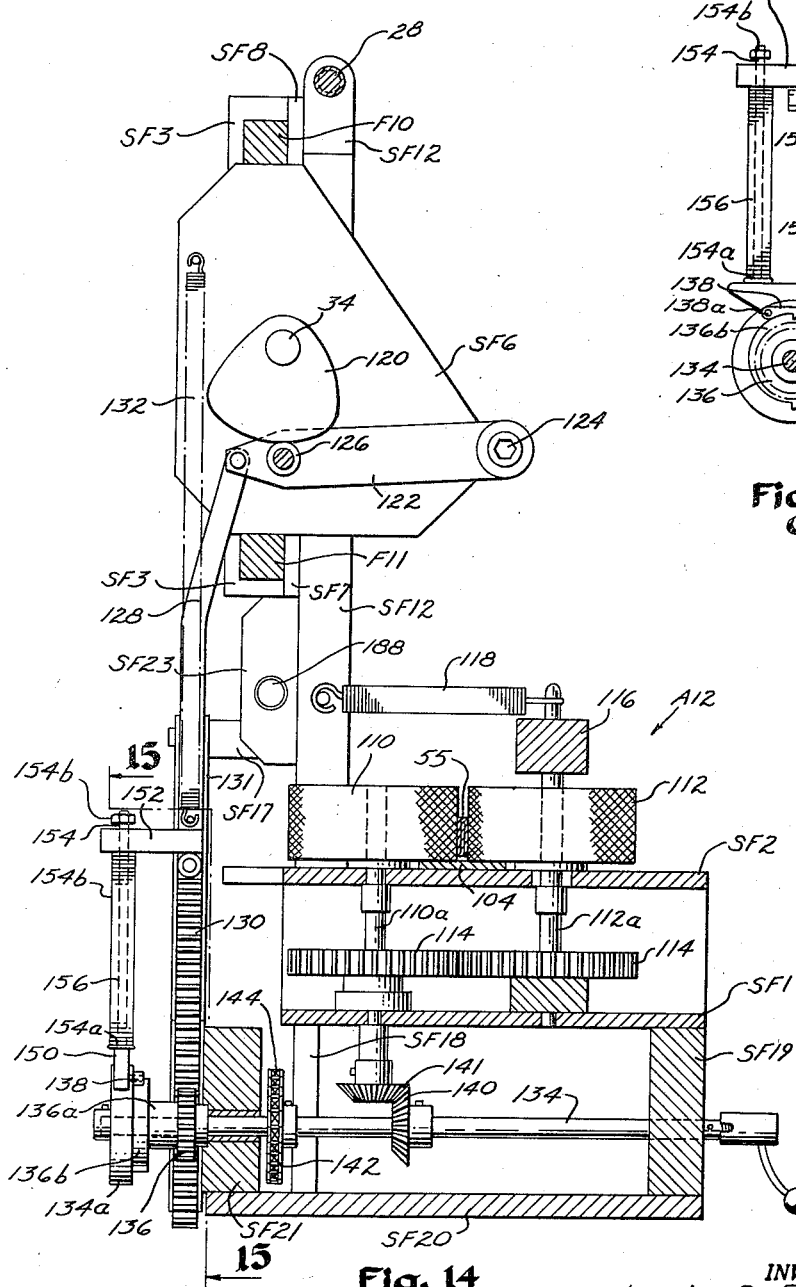

June 28, 1960            L. C. PEARCE            2,942,532

APPARATUS FOR FORMING AND AFFIXING A DIVIDER IN A BOX

Filed Aug. 9, 1956            13 Sheets-Sheet 8

INVENTOR.
Lewis C. Pearce
BY
Hyde, Meyer, Baldwin & Doran
Attorneys

June 28, 1960 L. C. PEARCE 2,942,532
APPARATUS FOR FORMING AND AFFIXING A DIVIDER IN A BOX
Filed Aug. 9, 1956 13 Sheets-Sheet 9

INVENTOR.
Lewis C. Pearce
BY
Hyde, Meyer, Baldwin & Doran
Attorneys

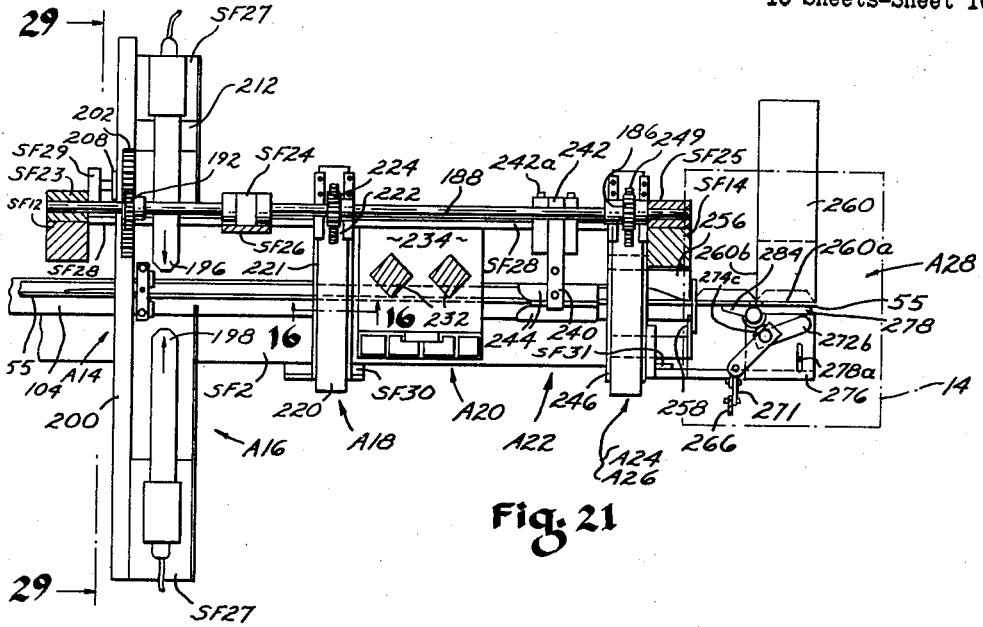
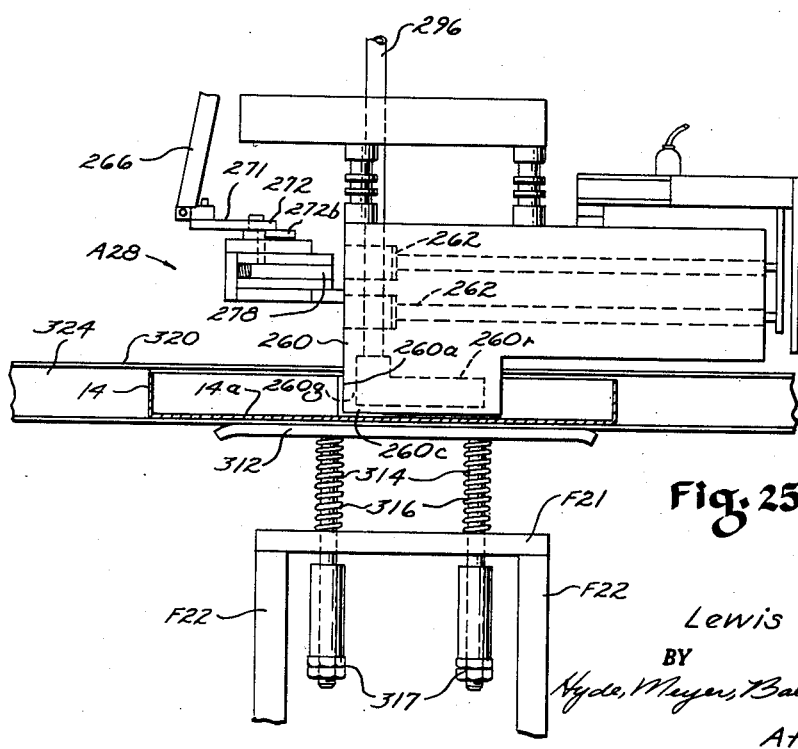

June 28, 1960 L. C. PEARCE 2,942,532
APPARATUS FOR FORMING AND AFFIXING A DIVIDER IN A BOX
Filed Aug. 9, 1956 13 Sheets-Sheet 11

INVENTOR.
Lewis C. Pearce
BY
Hyde, Meyer, Baldwin & Doran
Attorneys

June 28, 1960 L. C. PEARCE 2,942,532
APPARATUS FOR FORMING AND AFFIXING A DIVIDER IN A BOX
Filed Aug. 9, 1956 13 Sheets-Sheet 13

INVENTOR.
Lewis C. Pearce
BY
Hyde, Meyer, Baldwin & Doran
Attorneys

United States Patent Office 2,942,532
Patented June 28, 1960

2,942,532

APPARATUS FOR FORMING AND AFFIXING A DIVIDER IN A BOX

Lewis C. Pearce, Berea, Ohio, assignor to American Greetings Corporation, Cleveland, Ohio, a corporation of Ohio Filed Aug. 9, 1956, Ser. No. 603,142

22 Claims. (Cl. 93—37)

This invention relates to improvements in an apparatus for forming and affixing a divider member in a receptacle and the product thereof.

One of the objects of the present invention is to provide a receptacle having one or more divider members secured to its bottom wall.

A further object of the present invention is to provide a machine for bending a member in a plane non-perpendicular to the surface of the member to be applied to an article.

A further object of the present invention is to provide a machine for bending a member around a heated forming head with the head adapted to soften heat-sensitive adhesive on said member while applying said member to an article.

A further object of the present invention is to provide a divider member forming and applying machine for manufacturing divider members and securing them in receptacles.

A further object of the present invention is to provide a machine for securing divider members in two different positions in a receptacle so as to divide the receptacle into two, three or four compartments.

A further object of the present invention is to provide a machine having a receptacle conveying means for moving the receptacle from one station to another, means for securing at one of the stations a divider member in one position in the receptacle, and means for securing at another station another divider member in the receptacle spaced from said one position.

A further object of the present invention is to provide a machine for forming from a continuous strip of material an L-shaped section having one leg formed of overlapped widths.

A further object of the present invention is to provide a means for preheating an article as its approaches the station wherein a member is secured thereto by heat actuated adhesive.

A further object of the present invention is to provide a means for applying a member to an article at an applying station, means for conveying an article to and away from said applying station, and means for moving said applying means transversely and/or longitudinally relative to the path of article travel by said conveying means to change the location of said applying station on said conveying means.

A further object of the present invention is to provide a machine having two divider member forming and applying units with each being independently movable relative to each other and with respect to the path of travel of a receptacle in which said divider members are secured by said units, whereby different set-ups for different style and size receptacles may be easily achieved.

A further object of the present invention is to provide a receptacle having a plurality of divider members secured therein characterized by its structural simplicity, inexpensive manufacturing cost, and its strong and sturdy nature.

A further object of the present invention is to provide a divider member forming and applying machine characterized by its structural simplicity, its economy of operation, and its ease of operation.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

Fig. 7 is a schematic view of the two units of the machine for forming and adhesively securing divider members in a receptacle carried therebetween by a conveyor assembly;

Figs. 8 and 8a are side elevational views of a first unit A of this machine with Fig. 8a being a continuation of the left end of Fig. 8;

Fig. 9 is a lengthwise view of the conveyor assembly and the discharge end view of the two units with the central portion of this view taken as a section along the line 9—9 of Fig. 8 and with end portions of this view taken along the line 9A—9A of Fig. 8;

Fig. 14 is a transverse sectional view taken generally along the line 14—14 of Fig. 8 through the strip feeding assembly;

Fig. 15 is a longitudinal sectional view taken along the line 15—15 of Fig. 14 disclosing in more detail the over-running clutch and brake therefor;

Fig. 21 is a horizontal sectional view taken immediately above the strip being processed and looking downwardly thereon into the machine to disclose in more detail some of these assemblies;

Fig. 25 is a discharge end view of the applying head, similar to Fig. 23, with the head applying and adhesively securing the divider member in a receptacle;

Fig. 28 is a schematic view of a second form of box stop mechanism driven by the same power transmission; while

Figure 2:
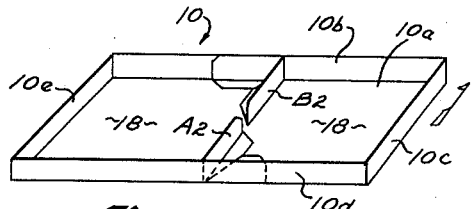
Fig. 2 is a perspective view of another form of two-compartment box.

Before the machine and products thereof here illustrated are specifically described, it is to be understood that the invention here involved is not limited to the structural details or arrangement of parts here shown since structures embodying the present invention may take various forms. It also is to be understood that the phraseology or terminology herein employed is for purposes of description and not of limitation since the scope of the present invention is denoted by the appended claims.

Figs. 1–6 illustrate different types of receptacles 10, 12 and 14 having divider members of the present invention secured therein. Although these receptacles are disclosed as the lower half of a box for receiving greeting cards, they could be receptacles for any article. Each receptacle is of basically the same construction so that only receptacle 14 will be described in detail. It has a flat-bottom wall 14a with four upstanding side walls 14b, 14c, 14d and 14e arranged in rectangular formation to form a closed side wall structure around the bottom wall. Divider members A2 and B2 are secured to the bottom wall 14a and divide the receptacle into four separate compartments 22. The divider members correspondingly divide receptacles 10 into two compartments 18 and receptacles 12 into three compartments 20.

Figures 3, 6:
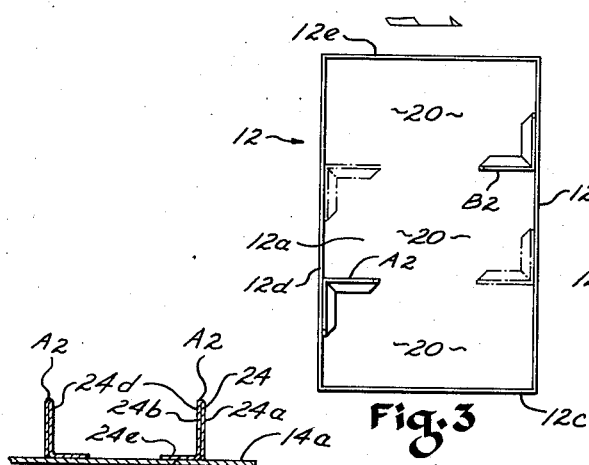
Fig. 3 is a top plan view of a three-compartment box, which travels with its long dimension transverse to the conveyor, having its divider members shown in alternate positions by solid lines and dot-dash lines.
Fig. 6 is a sectional view taken through a divider member along the line 6—6 of Fig. 5.

Each divider member, for example divider member A2, is L-shape in vertical cross section with a horizontal leg 24e secured to bottom wall 14a in Fig. 6 and a vertical leg 24d upstanding as a divider. The divider member is formed of a single sheet extending in cross section up one side 24a of the vertical leg, folded at the top thereof, extending down the other side 24b of the vertical leg and extending horizontally 24c outwardly to form the horizontal leg. One side of this sheet, facing inwardly on the vertical leg 24d and toward the bottom wall 14a on the horizontal leg 24e, has a polyethylene adhesive coating thereon heat softened to secure the surfaces together. The divider member is preferably secured to the bottom wall 14a of the receptacle so that it will be permanently located in this position and the greeting cards can be easily loaded into and removed from the receptacle. Divider member A2 is bent into two right angularly disposed elements 24g and 24h in Fig. 6a in a plane parallel to bottom wall 14a with the horizontal leg 24e notched at the junction of these two elements at 24j to prevent overlap of the horizontal leg portions. The divider member is also preferably vertically scored at 24k to make folding thereof easier and has beveled ends 24m and 24n to eliminate sharply projecting corners.

These divider members A2 and B2 are easy to manufacture, have a simple construction, and are easily applied and secured to a receptacle bottom wall at a high production rate.

Figure 4:
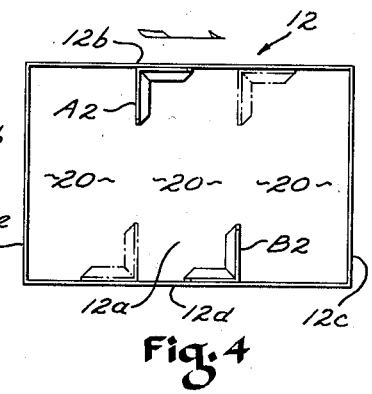
Fig. 4 is a top plan view of a three-compartment box, which travels with its long dimension longitudinally of the conveyor, having its divider members shown in alternate positions by solid lines and dot-dash lines.

The divider members may have different arrangements in different receptacles to provide different numbers of compartments. For example, in Fig. 5, the divider members are arranged in the shape of a cross at the center of the bottom wall 14a to divide the receptacle into four separate compartments 22. In Figs. 1–4, either one or two divider members are provided and are located respectively adjacent opposite side walls. Each divider member in each of these figures has the vertical leg of one of its elements 24g or 24h located close to and generally parallel to the receptacle side wall with its horizontal leg extending inwardly from the side wall and with its other element directed away from is associated side wall. This other element, whether it be 24g or 24h, helps divide the receptacle into two or three compartments. These other elements, directed away from the associated side wall, are coplanar in Fig. 2 to divide the receptacle into only two compartments or are spaced apart parallel to said side walls a distance one-third the total distance between the remaining side walls to divide the receptacle into three compartments in Figs. 3 and 4. Figs. 3 and 4 illustrate two different positions which the divider members may occupy, depending on the set-up of the machine, with one having the divider members shown in solid lines and the other in dot-dash lines.

Alternative constructions readily suggest themselves. Although the divider members in Figs. 5 and 6 have only one horizontal leg 24e extending outwardly from one side of the vertical leg 24d, horizontal legs may extend outwardly from opposite sides of the vertical leg for greater strength in this four-compartment receptacle. However, in Figs. 1–4, one of these two horizontal legs would have to be eliminated on the element parallel to the side wall since there would otherwise be interference between the horizontal leg and the side wall.

Figure 10:
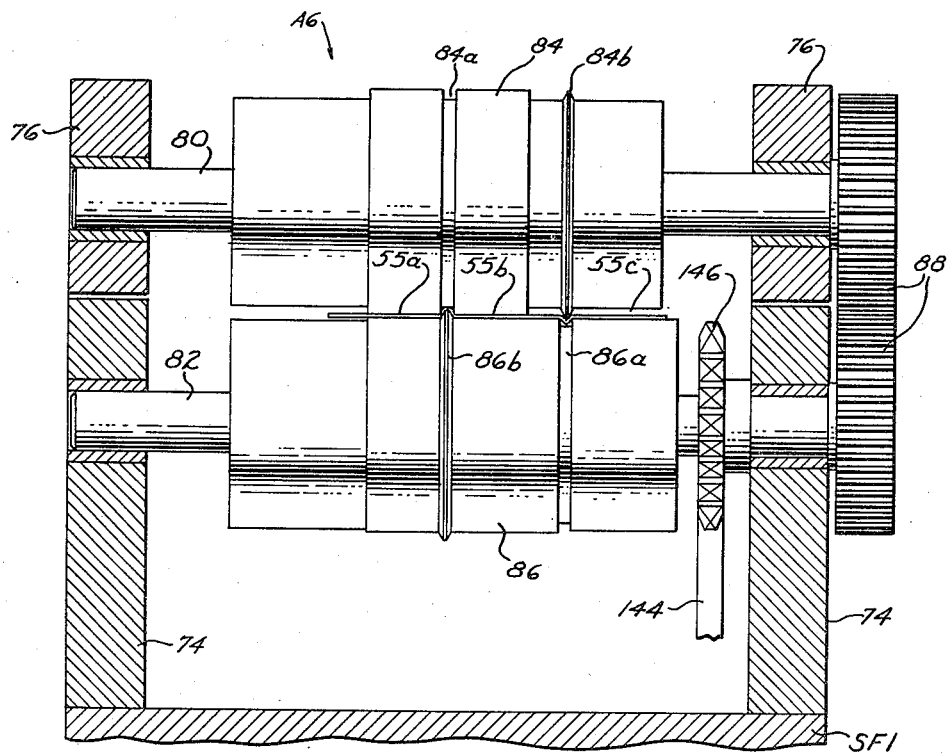
Fig. 10 is a transverse sectional view taken along the line 10—10 of Fig. 8a through a strip scoring assembly.

The remainder of this application deals with the divider member forming and applying machine for forming a divider member and then applying and securing it to a receptacle in any of the illustrated forms in Figs. 1–5 inclusive. This machine includes in Figs. 7 and 9 a first unit A and a second unit B for forming and applying divider members into receptacles, a receptacle conveyor assembly C and receptacle stop assemblies A1 and B1 for units A and B respectively. Each of the units, for example unit A, intermittently feeds a continuous strip 55 of material in Figs. 7, 8 and 8a from a supply assembly A4 through a scoring assembly A6 (also in Fig. 10) to divide the strip into three widths, through a first forming roll assembly A8 (Fig. 12), through a second forming roll assembly A10 (Fig. 11) for creasing the widths along the score lines, through feeding assembly A12 (Figs. 13 and 14) for driving the strip through the machine, through strip guide and spreader assembly A14 (Figs. 19 and 21), between the heat sealing heads of heat sealing assembly A16 (Figs. 21 and 29), through a first notching assembly A18 (Figs. 16 and 21), through a second notching assembly A20 (Fig. 21), through a strip guide A22 (Fig. 21), through a scoring assembly A24 (Figs. 17 and 21), through a cut-off assembly A26 (Figs. 17 and 21), and into a forming and applying assembly A28 (Figs. 9, 21, 22, 23, 24 and 25). Each unit A or B forms and adhesively affixes or secures a divider member into a receptacle, such as receptacle 14 in Fig. 7, as the receptacle is moved past the units by conveyor assembly C.

Only the first unit A will be specifically described in detail wherever possible.

For clarity, many parts have been omitted in the different views, but at least some of the rigidly interconnected frame members and at least some of the rigidly interconnected subframe members are shown throughout and designated by the reference numeral prefix F for the frame members and SF for the subframe members. The machine frame F includes in Fig. 8 vertical post frame members F1, F2, F3 and F4 connected together and held in upright position by horizontal frame members F6 and F7. Frame members F3 and F4 are generally of inverted U-shape to provide stability to the machine. A pair of horizontal frame rail members F10 and F11 are connected at opposite ends to frame members F1 and F3. The subframe SF is slidable along frame rail members F10 and F11 in Fig. 8, carries all assemblies from assembly A4 to A28, and permits movement of the assemblies transverse to the path of travel of conveyor assembly C. The subframe SF includes in Fig. 8 horizontal base plate members SF1 and SF2 connected together by vertical posts SF5, SF5. These base plate members are supported on frame rail members F10 and F11 by vertical post members SF3 and SF4 in Figs. 8, 14 and 8, 22 having rail guides at opposite ends thereof. Vertical post member SF3 in Figs. 8 and 14 has plate member SF6 and horizontal bar members SF7 and SF8 secured thereto. The other vertical post member SF4 has plate member SF10 and horizontal bar members SF7 and SF8 secured thereto. Vertical post members SF12, SF13 and SF14 in Fig. 8 connect bar members SF7 and SF8 together with post members SF12 and SF14 connected at their lower ends to base plate member SF2. Frame post member F3 in Fig. 8 has secured thereto plate and post members F14 and F15 respectively with post member F15 rotatably supporting against and thrust a lead screw 28 having an actuating hand wheel 26 at one end with said lead screw coacting with a nut 30 carried by post member SF12. The transverse movement of the subframe SF on frame F is provided by rotating hand wheel 26 in Fig. 8 to turn lead screw 28 so that nut 30 carried by subframe SF will cause this subframe to move transversely to the conveyor assembly C. Although the purpose of this transverse movement will be explained in more detail later in this description, it can be assumed for the present that the subframe SF is stationary on frame F for any given machine set-up.

Both units are provided with power drive from common drive shaft 32 in Figs. 8 and 9. In unit A, this power is supplied to a cam shaft 34 in Fig. 8. From the drive shaft 32, the drive progresses through clutch 40 controlled by shaft 40b and lever 40a, bevel gears 36 and 37, cross shaft 38, sprocket 44, enclosed chain drive 46, and sprocket 48 on cam shaft 34.

The frame F provides support for drive shaft 32 by having a plate F17 in Fig. 9 secured to frame member F6 to support inter-connected clutch 40 and bearing housing 35 with said housing rotatably supporting drive shaft 32. Plate F18 supports from frame member F6 clutch actuator shaft 40b.

Unit A must be able to move longitudinally along the conveyor assembly C to change machine set-up. To permit this, drive shaft 32 has a keyway extending along its length with a key driving clutch 40 so that clutch 40, gear 36 and housing 35, frame F and subframe SF are able to be moved along shaft 32. However, during any given set-up unit A does not move longitudinally along conveyor assembly C.

Since subframe SF is movable with respect to frame F transversely of conveyor assembly C, suitable allowance must be made in the power drive. Sprocket 48 is held against axial movement relative to frame member F3, and shaft 34 is driven by sprocket 48 through a loose, longitudinal keyway so that shaft 34 can move with the subframe on rotation of hand wheel 26 while sprocket 48 always drives shaft 34. Shaft 34 moves with subframe SF and is rotatably supported by subframe bracket SF16 in Fig. 8 secured at its lower end to plate SF1, frame member F3, subframe member SF13, and plate SF10.

Figure 27:
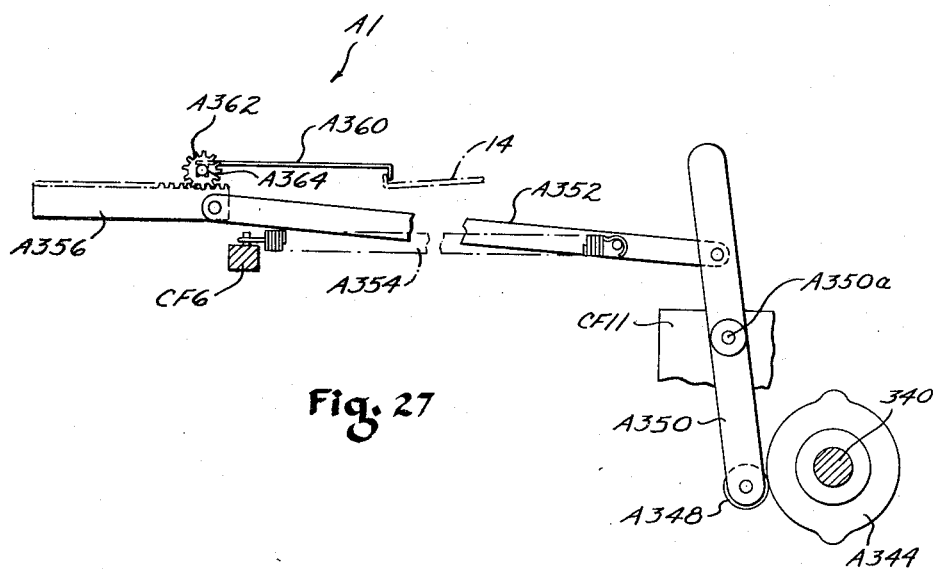
Fig. 27 is a schematic view of one form of box stop mechanism driven by the power transmission in Fig. 26.
Figure 28:
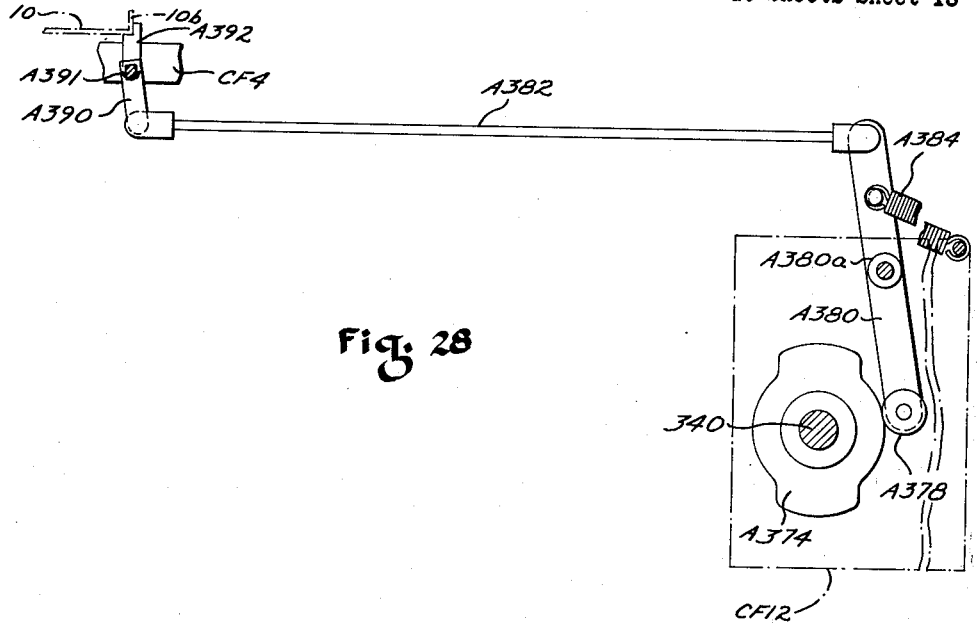

A synchronizing dial 50 is provided on cam shaft 34 to synchronize the movement between forming and applying assembly A28 and the receptacle stop assembly A1 in Fig. 9 and in Figs. 27 or 28. Engagement of the clutch 40 at the proper time, as designated by synchronizing dial 50, will assure that these assemblies are properly synchronized so that the divider member from unit A will be properly applied to and secured within the receptacle. Hand wheel 42 may be used to rotate shaft 38, when clutch 40 is disengaged, until synchronization is achieved.

Many views have been taken through unit A of the cams on cam shaft 34, the cams driving conveyor stop assemblies A1 and B1, and the component parts driven by said cams. No effort has been made to show them in corresponding positions, but instead each is shown in the best position to illustrate its mode of operation even though this position may be out of phase with other illustrated positions.

The supply assembly A4 is disclosed in Fig. 8a and includes a reel rotatably supported on subframe plate member SF1 with a roll 54 of strip material 55 thereon with the underside of the strip (as it progresses horizontally to the right in Figs. 8 and 8a) having a heat sensitive adhesive material, such as polyethylene, laminated to the paper, and the other or upper side being free of said adhesive to form respectively adhesive and non-adhesive sides. Leather strap 56 has a weight 58 at its lower distal end and is detachably secured to subframe member SF1 at its upper end so that strap 56 will bear against the periphery of roll 54 to act as a tensioning means and to prevent inertia type overtravel of the roll. Strip guide rolls 60 and 64 are respectively mounted by bar 62 and bracket 66 to subframe member SF1. A strip pull-off mechanism is also included so that roll 54 will rotate at substantially a uniform speed even though the strip is being fed forwardly by feeding assembly A12 at an intermittent rate. This pull-off mechanism includes a bar 68 pivotally connected at its lower end at 68a to subframe member SF1 and having a strip guide roll 70 at its distal end with a spring 72 secured at opposite ends to bracket 66 and bar 68 adapted to bias the bar clockwise about pivot 68a. Roll 70 and bar 68 move counterclockwise downwardly as the feeding action takes place, so that when feeding stops, spring 72 exerts a greater tension upon the strip loop and tends to keep the roll 54 rotating in the same direction.

Although the supply is shown herein as a continuous strip or web of material being fed from a supply roll, the supply may take the form of a stack of sheets cut to proper size to form divider members with the machine adapted to feed the sheets individually from the supply stack through any of the desired operations.

Scoring assembly A6 is provided for dividing the strip 55 longitudinally into three widths 55a, 55b and 55c taking the form of widths 24a, 24b and 24c in Fig. 6 in the finished divider member. This scoring assembly A6 in Figs. 8a and 10 includes opposite side walls 74, 74 secured to subframe member SF1 and having pivotally mounted on each a bar 76 at pivot 76a maintained in proper adjustment by lock screws 78 and 79. Screw 78 loosely telescopes through a bore in bar 76 and screws into wall 74. A spring 78a, located between the head of screw 78 and bar 76, biases bar 76 clockwise about pivot 76a. Screw 79 is threaded into bar 76 and bears against wall 74 to limit the extent of clockwise movement. An upper shaft 80 and a lower shaft 82 have mounted thereon respectively scoring rolls 84 and 86 with each having a groove 84a or 86a and a ridge 84b or 86b with the groove on one coacting with a ridge on the other to make one of the score lines. Gears 88 on shafts 80 and 82 keep the scoring rolls 84 and 86 rotating synchronously.

Figure 12:
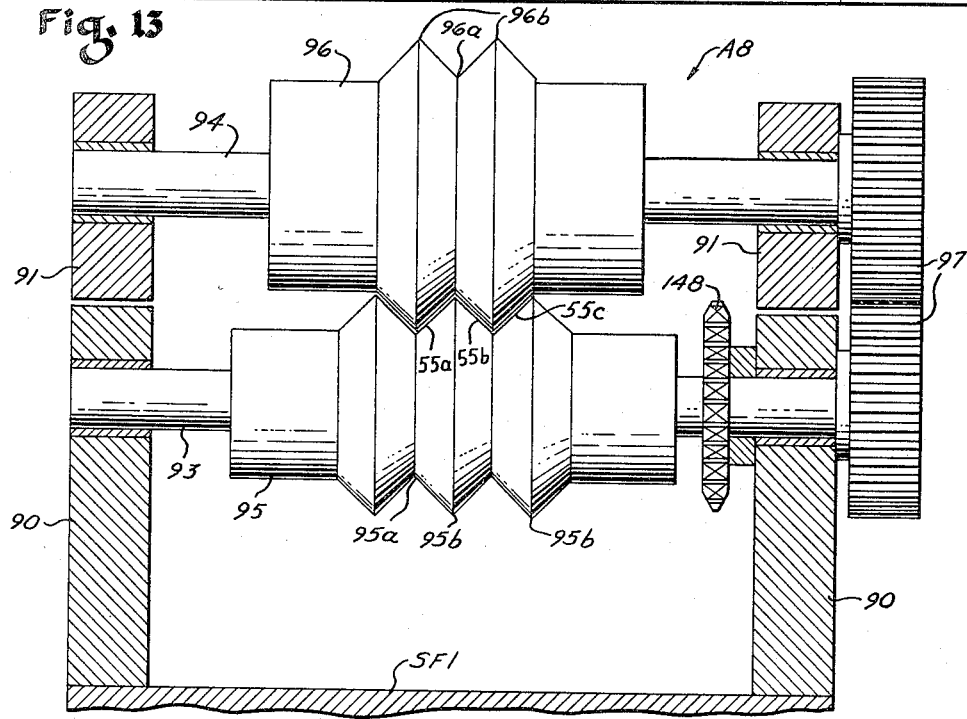
Fig. 12 is a transverse sectional view taken along the line 12—12 of Fig. 8 through a first forming roll assembly.

A first forming roll assembly A8 is shown in Figs. 8 and 12 and is of similar construction. Side walls 90, 90 are secured to subframe member SF1 with each having a bar 91 hinged thereto at pivot 91a and adapted to be locked in any given position by lock screws 92 and 98 and spring 92a in the same manner as screws 78 and 79 and spring 78a. Forming roll shafts 93 and 94 are rotatably mounted in side walls 90 and bars 91 and have respectively mounted thereon forming rolls 95 and 96 having grooves 95a and 96a and ridges 95b and 96b respectively with ridges and grooves coacting in the manner shown in Fig. 12 to bend the strip widths in the manner shown. Gears 97, secured to shafts 93 and 94, keep the forming rolls synchronized.

Figure 11:
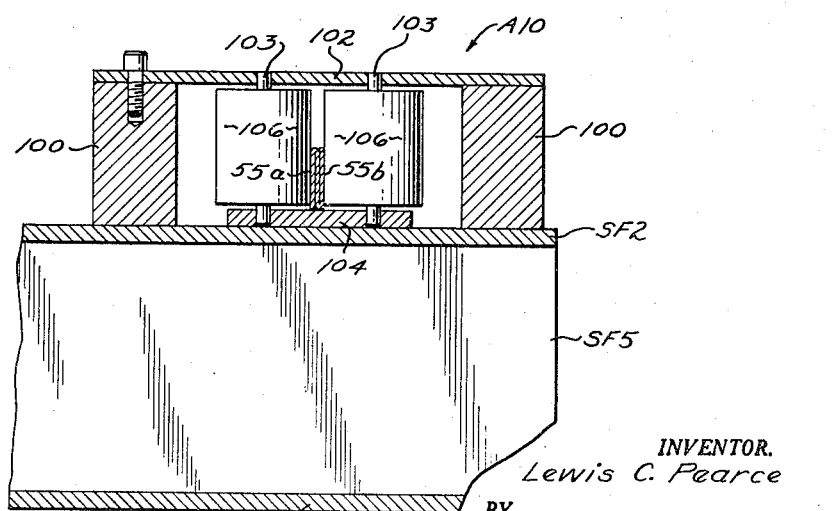
Fig. 11 is a transverse sectional view taken along the line 11—11 of Fig. 8 through a second forming roll assembly.

A second forming roll assembly A10 in Figs. 8 and 11 creases the scored folds more firmly. It includes two posts 100, 100 secured to subframe member SF2 and connected together by a top plate 102. Shafts 103 are rotatably mounted on opposite ends in top plate 102 and a base plate 104 secured to subframe member SF2. Each shaft has a roll 106 thereon for performing the creasing operation. This base plate 104 supports the strip 55 from assembly A10 to A26 in Figs. 8, 11, 13, 14, 16, 17, 21 and 29.

Figure 13:
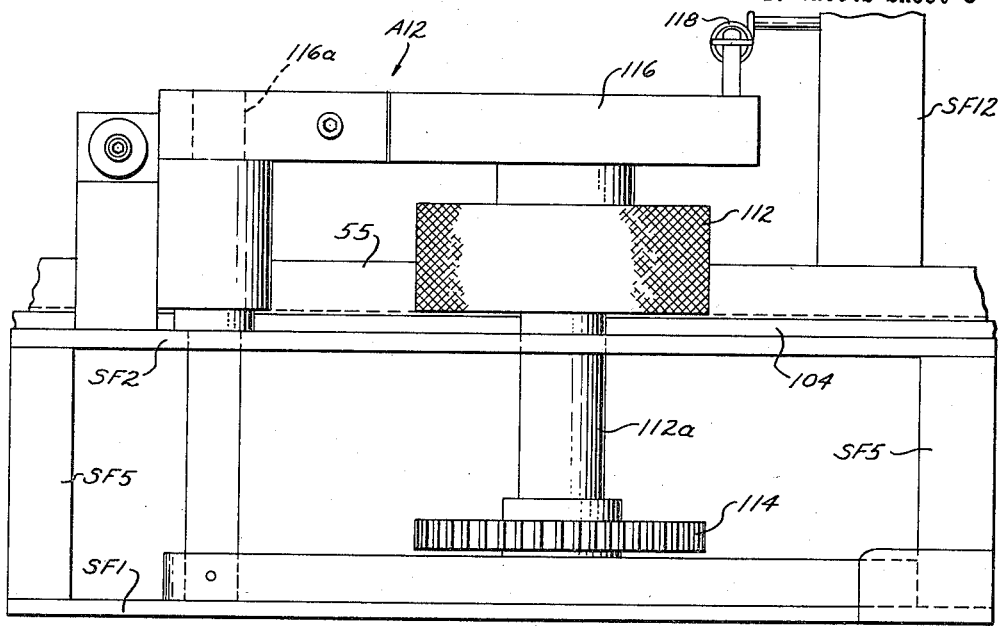
Fig. 13 is a side elevational view of a strip feeding assembly in Fig. 8.

A strip feeding or advancing assembly A12 is shown in Figs. 8, 13 and 14 for intermittently feeding the continuous strip 55 of material from supply assembly A4 through the machine. In Fig. 14, a pair of knurled feed rolls 110, 112 are rotatably supported respectively by shafts 110a and 112a on subframe members SF1 and SF2 and are driven by gears 114 secured to said shafts so that the feed rolls will rotate synchronously. An arm 116 in Figs. 13 and 14 is pivotally mounted at pivot 116a to subframe member SF2 and is biased by spring 118, secured at its outer end to subframe member SF12 so as to urge the feed roll 112 against feed roll 110 since shaft 112a is journalled at its upper end in arm 116 and shaft 112a is free to move intermediate its ends in an elongated slot in subframe member SF2 in Fig. 14.

A common drive is provided for scoring assembly A6, first forming roll assembly A8, and strip feeding or advancing assembly A12 for driving them intermittently and always in the same direction. Cam shaft 34 rotates a cam 120 in Figs. 8 and 14 for oscillating a lever 122 by cam follower 126 with said lever pivoted at 124 to the subframe plate member SF6. A link 128 is pivotally connected at opposite ends to the distal end of lever 122 and to a rack 130 traveling in a U-shaped guide 131 with said guide 131 secured in Fig. 14 at its upper end to vertical post member SF12 by post SF17 and at its lower end to plate SF1 by plates SF18, SF19, SF20 and SF21 connected therebetween. Spring 132, secured at opposite ends to rack 130 and subframe plate member SF6, biases the follower 126 against the periphery of cam 120. Cross shaft 134 is rotatably mounted in subframe plate members SF19 and SF21 and has a pinion 136 rotatably mounted thereon by a sleeve 136a with the pinion 136 in engagement with the teeth of rack 130. Ratchet wheel 136b is rigidly carried by the left end of sleeve 136a and is adapted to have its ratchet teeth detachably engaged by a pawl 138 pivoted at 138a to a disk 134b secured to the cross shaft 134 extending through the bore in sleeve 136a. Hence, the rotation of shaft 134 will take place intermittently and in only one direction because the pawl 138 will ratchet over the teeth of ratchet wheel 136b during rotation of wheel 136b in one direction. Drive takes place as cam 120 increases in cam height, link 128 moves downwardly in Fig. 14, ratchet wheel 136b rotates clockwise in Fig. 15 and carries pawl 138 in driving engagement therewith to rotate shaft 134 in the same direction. During decrease in height of cam 120, pawl 138 slides over the teeth of ratchet wheel 136b and shaft 134 does not rotate.

Rotation of shaft 134 provides the drive for assemblies A6, A8 and A12. Feed rolls 110, 112 of assembly A12 are driven through bevel gears 140 and 141 connecting shaft 134 with shaft 110a. A drive sprocket 142 on shaft 134 drives by chain 144 a sprocket 146 on scoring assembly shaft 82 in Fig. 10 and a sprocket 148 on shaft 93 in the first forming roll assembly A8 in Fig. 12. See also Figs. 8 and 8a.

A brake is provided in Figs. 14 and 15 to prevent over-driving of shaft 134. The brake includes a brake arm 150 in Fig. 15 pivoted at 150a to rack guide 131 and a bracket 152 connected between link 128 and rack 130 and telescopically mounted over bolt 154 at its distal end. This bolt has a head 154a adapted to engage against the top surface of brake arm 150 and an adjustable stop nut 154b to control the effective length of the bolt in cooperation with a spring 156 telescoped over the bolt between head 154a and bracket 152. Nut 154b is adjusted so that the bolt head 154a strikes the brake arm 150 at a predetermined time so as to control the instant of brake engagement during downward travel of rack 130 as it approaches the end of the driving stroke for rotating shaft 134. Spring 156 prevents coasting over-travel by applying more braking pressure to the periphery of disk 134a as the end of the cam follower stroke is reached.

Figure 19:
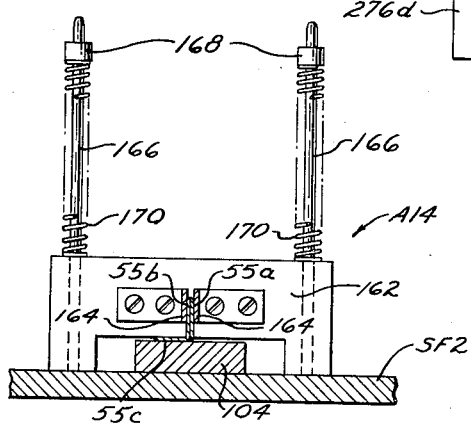
Fig. 19 is a transverse sectional view taken along the line 19—19 of Fig. 8 of the strip guide and spreader assembly.

A strip guide and spreader assembly A14 is provided in Figs. 8, 19 and 21. It includes base strip 164 and posts 166, 166 secured to subframe member SF2. A movable block 162 is telescoped over posts 166 and has two strip guide brackets 164, 164 secured thereto for forming the strip into the L-shape cross section desired in the finished divider member in Fig. 6. A stop sleeve 168 is secured adjacent the top of each of said posts with a compression spring 170 telescoped over the post and located between the stop sleeve and movable block to bias the block 162 downwardly into the Fig. 19 position. However, the springs permit the block 162 to be lifted to clear the passageway for the strip. Now it should be apparent that this construction forms the strip into an L-shaped section by bending one strip width 55c at right angles to the other two widths 55a and 55b and also folding longitudinally the other two widths 55a and 55b in overlapped relationship in response to the feeding motion so that one width 55c forms one leg and the other two of said widths overlap and form the other leg. Also, the adhesive material is located between widths 55a and 55b and on the lower surface of width 55c to aid in forming the completed divider member A2 in Figs. 6 and 6a.

It should be noted that the strip 55 is fed intermittently by feed rolls 110, 112 in Fig. 14 from assembly A4 through assemblies A6, A8, A10, A12 and A14. However, when the feed is inactive so that the strip is stationary, the following assemblies perform operations simultaneously on the strip with these assemblies including the heat seal assembly A16 for sealing together the overlapped widths 55a and 55b by the thermoplastic material therebetween, a first notching assembly A18 for notching the vertical leg formed by widths 55a and 55b, a second notching assembly A20 for notching the horizontal leg 55c, a scoring assembly A24 for scoring the vertical leg formed by overlapped widths 55a and 55b, and a cut-off assembly A26 for cutting off a member from the terminal end of the strip at the location wherein the member is formed into the shape of the divider member A2 in Figs. 1–6.

Figure 20:
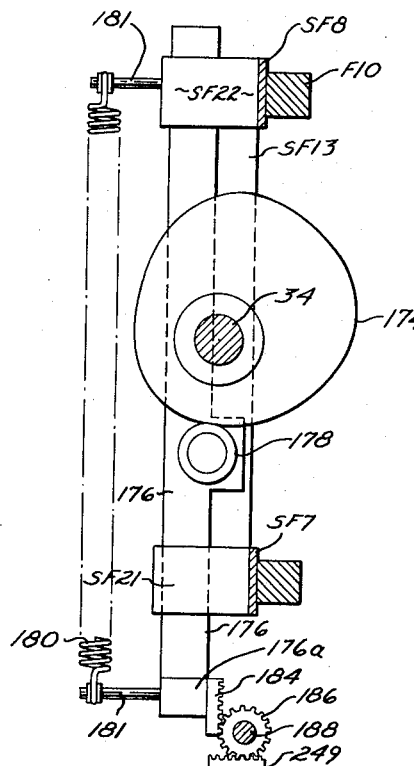
Fig. 20 is a transverse sectional view of a common drive for the heat sealing assembly, first and second notching assemblies, scoring assembly and cut-off assembly taken along the line 20—20 of Fig. 8.

These different assemblies perform their operations simultaneously by a common drive. This drive takes place by cam shaft 34 in Figs. 8 and 20 rotating cam 174 thereon for reciprocating bar 176 (mounted for reciprocation in guides SF21 and SF22 secured to respectively subframe members SF7 and SF8 and to subframe member SF13) with follower roller 178 on bar 176 bearing against the periphery of cam 174 by spring 180 resiliently urging the follower roller 178 upwardly against the periphery of cam 174. Spring 180 has its opposite ends carried by end pins 181, 181 secured respectively to subframe guide member SF22 and a cross head 176a on bar 176. A rack 184, secured to head 176a, is adapted to rotate a pinion 186 driving a longitudinal shaft 188 rotatably supported in Figs. 8, 14 and 21 by bearing blocks SF23, SF24 and SF25 secured respectively to sub-frame members SF12, SF26 and SF14 with subframe member SF26 secured to and depending from subframe member SF7. This shaft 188 provides the drive for the assemblies A16, A18, A20, A24 and A26.

Figure 29:
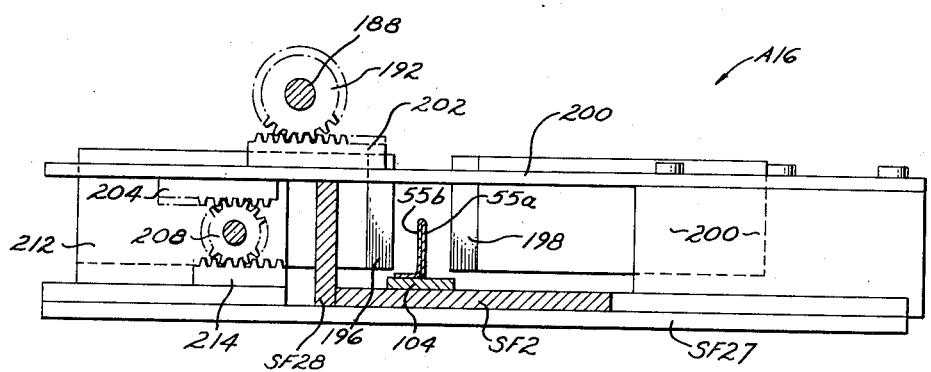
Fig. 29 is a schematic view of the heat sealing assembly and the drive between the heater heads thereof taken along the line 29—29 of Fig. 21.

A heat sealing assembly A16 is provided in Figs. 8, 21 and 29 for adhesively securing the overlapped widths 55a and 55b together by applying heat and pressure thereto during the non-feeding part of the machine cycle. This assembly includes two heating heads 196 and 198 located astride these overlapped widths 55a and 55b for sealing them together. Each of the heads has an electrically operated, resistance type heating unit therein for softening the heat sensitive adhesive material between these widths when in contact therewith. Means is also provided for simultaneously advancing these heads 196, 198 into strip contact for heat sealing these overlapped widths together during non-feeding and for retracting the heads to permit strip feeding. This includes a drive pinion 192 on the common drive shaft 188 adapted to move head carrier 200 for head 198 and carrier 212 for head 196 by reciprocating motions in and out transverse to the feed of strip 55. A supporting frame structure in Figs. 21 and 29 is provided by a transverse plate SF27 secured to the bottom of plate SF2, a side wall plate SF28 secured to one side of and extending along the length of plate SF2, and a wall SF29 secured to and extending out from plate SF28. Carriers 200 and 212 are mounted for generally transverse reciprocation in an upwardly extending U-shaped channel formed in the top of plate SF27. Carrier 200 has secured thereto, in addition to heater 198, a rack 202 for providing drive thereto from pinion 192 and a motion transfer rack 204 for aiding in the transfer of the motion of carrier 200 to carrier 212 so that they will move in or out simultaneously. A motion transfer pinion 208, rotatably mounted on subframe wall SF29, meshes with motion transfer rack 204 and rack 214 on carrier 212. Hence, heater heads 196 and 198 will move simultaneously inwardly or outwardly depending upon the direction of rotation of drive shaft 188. When the heads are in their inward position in strip contact, they will heat seal the widths 55a and 55b together, and when they are retracted outwardly away from the strip, feeding of the strip will be permitted.

Figure 5:
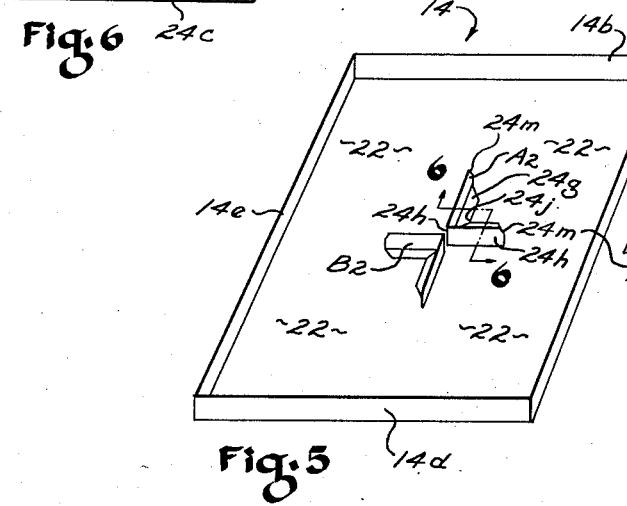
Fig. 5 is a perspective view of a four-compartment box.
Figure 16:
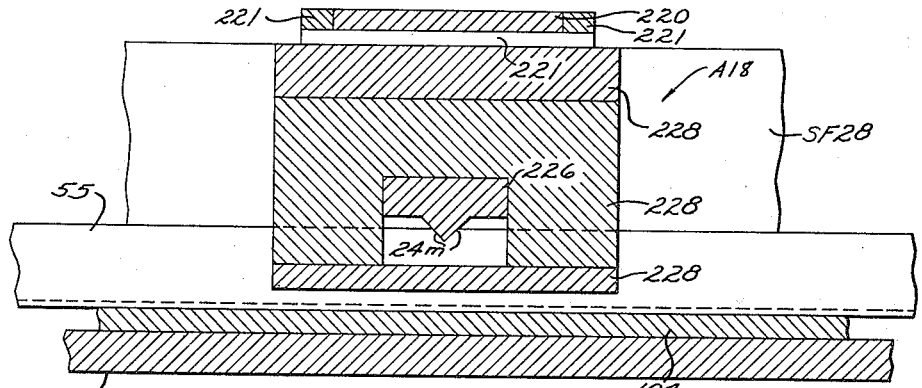
Fig. 16 is a longitudinal sectional view taken along the line 16—16 of Fig. 21 through a first notching assembly.

A first notching assembly A18 is provided in Figs. 8, 16 and 21 for forming the beveled ends 24m, 24m in Fig. 5 by making an upwardly V-notch in the widths 55a, 55b. Only one notch is made per feeding stroke and this is located at the end and between adjacent strip sections with each section adapted to be cut off at a later time by cut-off assembly A26 into the proper length for forming into a divider member. This notching assembly A18 includes a slide 220 driven by drive shaft 188 rotating pinion 224 and driving rack 222 secured to the slide 220 mounted for transverse reciprocation in slide guide 221 secured at opposite ends to wall plate SF28 and a plate SF30 secured at opposite side edges of plate SF2. Slide 220 carries a male die 226 reciprocable transversely in a female die 228 secured to wall plate SF28. Hence, as the shaft 188 is rotated in one direction, the male die 226 V-notches strip widths 55a and 55b and then the die 226 is retracted, as the shaft rotates in the opposite direction, to permit feeding of strip 55.

A second notching assembly A20 is shown in Figs. 8 and 21. This includes two punch type male die members 232 secured in T-slots 176b of head 176a in Figs. 8 and 20. Male die member guide 234 and female die member 236 are respectively secured to and carried by subframe plates SF2 and SF28. As head 176a moves downwardly, the two male die members 232 provide two V-notches, one at one end of a section of the strip to be cut off for forming into a divider member and therefore forming the beveled end 24n in Fig. 6a on one end of one section and on the other end of the adjacent section and another between elements 24g and 24h to provide notch 24j. These notches are transversely formed in the horizontal leg 24e (in width 55c) with the notch 24j dividing the finished divider member A2 into two elements 24g, 24h and the horizontal leg 24e into two portions.

A strip guide assembly A22 is provided in Figs. 8 and 21 and includes a bracket 240 secured by clamp 242 and clamp bolts 242a to subframe plate member SF28. The distal end of bracket 240 carries two guide members 244, 244 straddling and guiding the outer sides of overlapped strip widths 55a and 55b.

Figure 6A:
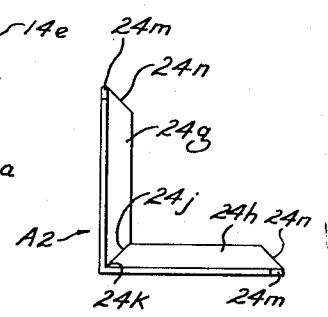
Fig. 6a is a top plan view of one of the divider members.
Figure 17:
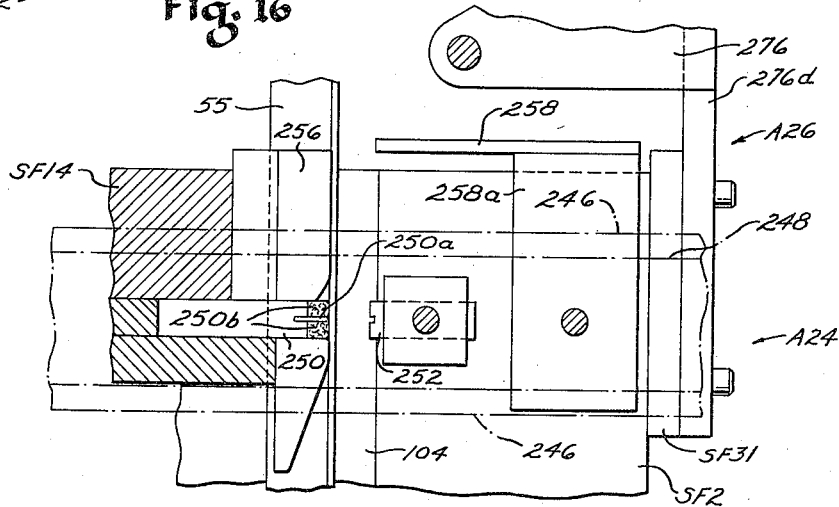
Fig. 17 is an enlarged longitudinal, horizontal sectional view of creasing and cut-off assemblies in the right-hand portion of Fig. 21 with Fig. 17 taken below the actuating slide and rotated 90 degrees from the Fig. 21 position.

The scoring assembly A24 is provided in Figs. 17 and 21 transversely scoring at 24k the vertical leg formed by strip widths 55a and 55b to form a transverse bend line at notch 24j to divide the finished divider member A2 after cut-off into two elements 24g and 24h in Fig. 6a with each including one of the portions of horizontal leg 24e provided on opposite sides of notch 24j. Here, the scoring assembly A24 includes a slide 248 driven by rack 249 and carrying a scoring head 252 coacting with an anvil 250 having a scoring member 250a and resilient backup material 250b coactable with head 252. Slide 248 is mounted in a slide guide 246 for reciprocation transverse to the path of this strip travel with this guide 246 being secured at opposite ends to plate SF28 and plate SF31 secured to opposite side edges of plate SF2. Anvil 250 is secured to post SF14 and plates SF28 and SF2.

A cut-off assembly A26 in Figs. 8, 17 and 21 is provided for transversely cutting off a member from the terminal end of the strip from which the divider member A2 is formed. This cut-off takes place so that the elements 24g, 24h in Fig. 6a are of approximately equal length on opposite sides of the notch 24j and the score 24k in Fig. 6a. This assembly includes slide 248, rack 249 in Fig. 21 coacting with pinion 186 in Fig. 20, a cut-off blade 253 secured to slide 248 by bracket 253a, and an anvil 256 against which the blade acts. Anvil 256 is secured to the subframe post SF14.

A forming and applying assembly A28 is illustrated in Figs. 7, 8, 9, 21, 22, 23, 24, and 25. This assembly forms, either before, during or after cut-off, a section cut from the terminal end of the strip into a divider member with two right angularly disposed elements 24g and 24h in Fig. 6a and then applies and adhesively secures this divider member A2 to the inside surface of the flat bottom wall 14a in Fig. 5 of receptacle 14. This assembly bends transversely about the score line 24k the vertical leg 24d, formed by overlapped widths 55a and 55b, with this bend occurring at the notch 24j and score 24k. The member is bent into two right angularly disposed elements 24g and 24h. Then, the assembly causes relative approach movement between the divider member A2 and receptacle 14, and then applies and secures adhesively by heat and pressure both portions of the horizontal leg 24e in coplanar relationship to the interior surface of flat bottom wall 14a of the receptacle 14 so that the vertical leg 24d retains its bent form about the score line 24k and forms a divider therein extending upwardly from bottom wall 14a in the manner shown in Figs. 5 and 6 with the right angular disposition between the elements 24g and 24h in Fig. 6a being maintained.

This assembly A28 includes a forming and applying head 260 coacting with the cut-off section from the strip to aid in performing each of these functions in forming and applying the divider member made therefrom. Head 260 has a plurality of electrical resistance type heaters 262 therein, here shown as three in number, for heating the solid metal construction of the head. The forming head has three distinct surfaces (forming surfaces 260a and 260b on adjacent sides and extending in the vertical direction and a pressing surface 260c right angularly disposed with respect to each of the forming surfaces 260a and 260b and extending horizontally across the bottom of the head). The forming surfaces 260a and 260b are right angularly disposed so that the two surfaces are not flat or planar when considered together although each is flat and planar in itself.

The strip feeding assembly A12 advances the strip 55 along forming surface 260a on one side of head 260 until it has reached the length shown in Fig. 21. After cut-off assembly A26 cuts off the member, vertical leg 24d is wrapped around forming surfaces 260a and 260b so that the divider members may be applied to the receptacle bottom wall.

Figure 23:
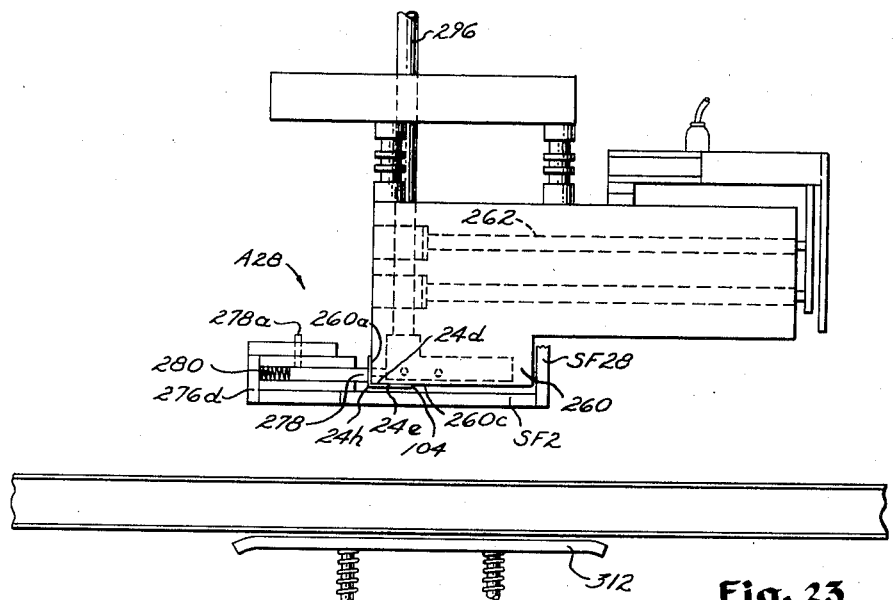
Fig. 23 is a discharge end view of the forming and applying head in unit A with the terminal end of the strip clamped thereagainst.
Figure 24:
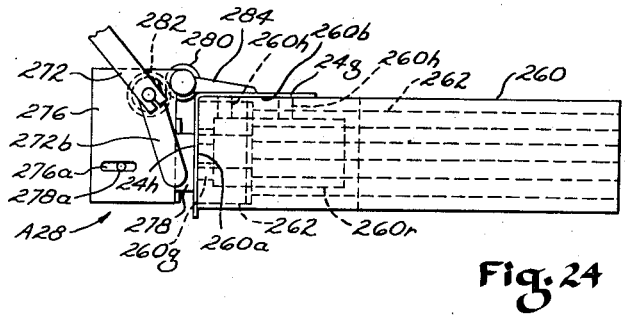
Fig. 24 is a top plan view of the forming and applying head of Fig. 23 isolated from its support and with the strip cut off to form a divider member with said member wrapped around the head.
Figure 26:
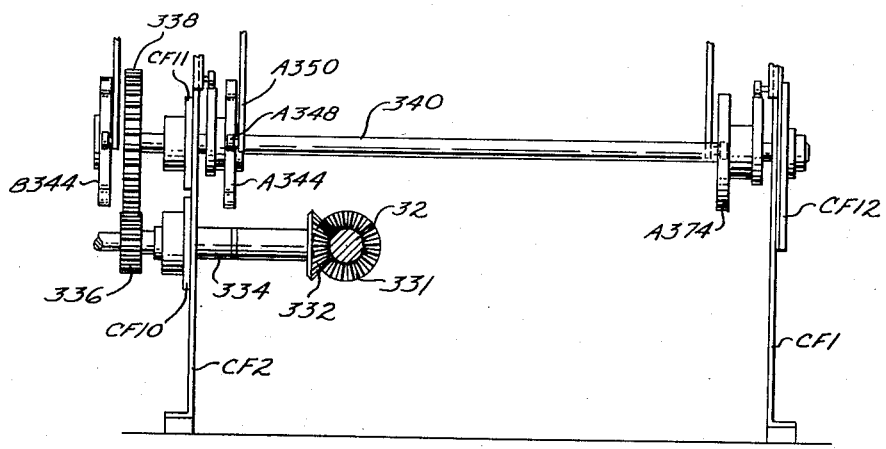
Fig. 26 is a transverse sectional view through the drive shaft beyond the right end of Fig. 9 and looking from the left toward the right.

A suitable drive mechanism is provided for causing this wrap-around action. Drive takes place from cam shaft 34 in Fig. 22 through cam 264 thereon, follower 268 on one end of link 266, and link 266 pivoted at 266a to a subframe guide block member SF33, secured to bar SF7. Follower 268, at the upper end of link 266, is resiliently biased against the periphery of cam 264 by spring 270 secured at its right-hand end to subframe post member SF14 in Fig. 22. The lower end of link 266 is pivotally connected to a link 271 pivotally connected by a universal joint to arm 272a of bell crank 272 in Fig. 21. Bell crank 272 actuates a holding block 278 for pushing the vertical leg 24d of element 24h against forming surface 260a, as shown in Figs. 23 and 24 to hold the divider member A2 in the manner shown in Fig. 21 during and after cut-off. This block 278 is slidably mounted for reciprocation into and out of housing 276 secured to subframe plate member SF2 by bracket plate 276d and plate SF31 in Figs. 17, 22 and 23. Block 278 is biased into the Fig. 23 or 24 position by a compression spring 280 in Fig. 23 but is normally held in the retracted position away from head 260 by the other arm 272b of bell crank 272 engaging against pin 278a carried by block 278 and travelling in slot 276a of housing 276. After the strip has been fed out to proper length, as shown in Fig. 21, the bell crank 272 rotates counterclockwise about its pivot 272c in Fig. 21 on housing 276 to permit the block 278 to move outwardly toward strip 55 to the position shown in Fig. 21.

Then, cut-off of the terminal section of strip 55 occurs by cut-off assembly A26 to form the cut-off member.

After cut-off, a folding arm 284 moves from the Fig. 21 to 24 position to swing the element 24g about the score 24k to right angular relationship with respect to element 24h to form the finished divider member A2. Folding arm 284 is swung clockwise from the Fig. 21 to 24 positions by continued counterclockwise movement of bell crank 272 about its pivot 272c. Folding arm 284 and gear 280 are secured to a common shaft rotatably mounted about a vertical center line in block 276 while the pivot shaft 272c of bell crank 272 has secured thereto a gear 282 meshing with gear 280. Rotation of bell crank 272 about its pivot will also rotate folding arm 284 about its pivot to provide the wrap-around action.

Examination of Fig. 21 will clearly reveal that considerable counterclockwise movement takes place by the bell crank arm 272b after it releases pin 278a to permit holding block 278 to move inwardly before the folding finger 284 starts to fold the trailing element of the divider member around head 260 and against forming surface 260b. This lost motion permits sufficient time for the cut-off action to take place between the first gripping by holding block 278 and the beginning of the wrap-around action by folding arm 284.

Note that this bending by folding arm 284 takes place in the plane of receptacle bottom wall 14a, of horizontal leg 24e of the divider member A2 and of pressing surface 260c of the forming head 260. Now, the divider member is bent into final form and is ready to be applied and adhesively affixed or secured to the bottom wall 14a of the receptacle 14. In this right-angularly bent or folded position, vertical leg 24d of element 24h is pushed against forming surface 260a, vertical leg 24d of element 24g is pushed against forming surface 260b, both portions of the horizontal leg 24e are held upwardly against the bottom of the pressing surface 260c, score 24k is located at the junction corner of forming surfaces 260a and 260b, and notch 24j permits the bevelled edges of horizontal leg portions 24e to abut against each other while these leg portions are in coplanar relationship. It should be noted that even if V-notch 24j were replaced by a transverse slit in the horizontal leg 24e, it would permit bending divider member A2 right-angularly to conform with forming surfaces 260a and 260b.

A vacuum is applied through head 260 to hold said divider member A2 in its right-angularly bent relationship on head 260. Here, a ported valve plate 290 in Fig. 8 is secured to cam shaft 34 and rotates therewith between straddling housing plates 292, 292 secured non-rotatably to subframe post member SF14. A hose 294 is connected to a vacuum source and another hose 296 is connected to the forming head 260. The ports in plate 290 are so formed that the vacuum will be applied and released at the proper time in timed relationship with the rotation of cam shaft 34. Vacuum is applied after completion of the bending of the divider member A2 into the right-angular form shown in Fig. 24. The vacuum is applied through hose 296 into head interior recess 260r in Figs. 24 and 25 and through vacuum holes 260g and 260h extending respectively through head 260 from recess 260r to forming surfaces 260a and 260b. Hence, since the divider member A2 has been pressed against these surfaces to close these holes, the vacuum applied through these holes will hold the divider member A2 in the right-angularly bent relationship in conformity with head 260 upon release of holding block 278 and folding arm 284 by rotation of bell crank 272 clockwise about its pivot 272c from its position shown in Fig. 24 to retract them to the Fig. 25 position.

Means is provided for causing relative approach movement between divider member A2 and receptacle 14 with this approach movement taking the form in the present disclosure of downward movement of head 260 from the position shown in Fig. 23 to that shown in Fig. 25 so that the pressing surface 260c of the head 260 moves downwardly toward the receptacle so as to secure the bottom portions of horizontal leg 24e adhesively to the inner surface of the flat bottom wall 14a of the receptacle 14 by the heat sensitive adhesive carried by the outer or lower surface of this horizontal leg 24e while the divider member A2 is held in this right-angularly bent relationship. Then, when the head is moved back upwardly to its Fig. 23 position, the divider member A2 has been applied to and adhesively secured in the receptacle 14 in the manner shown.

Figure 22:
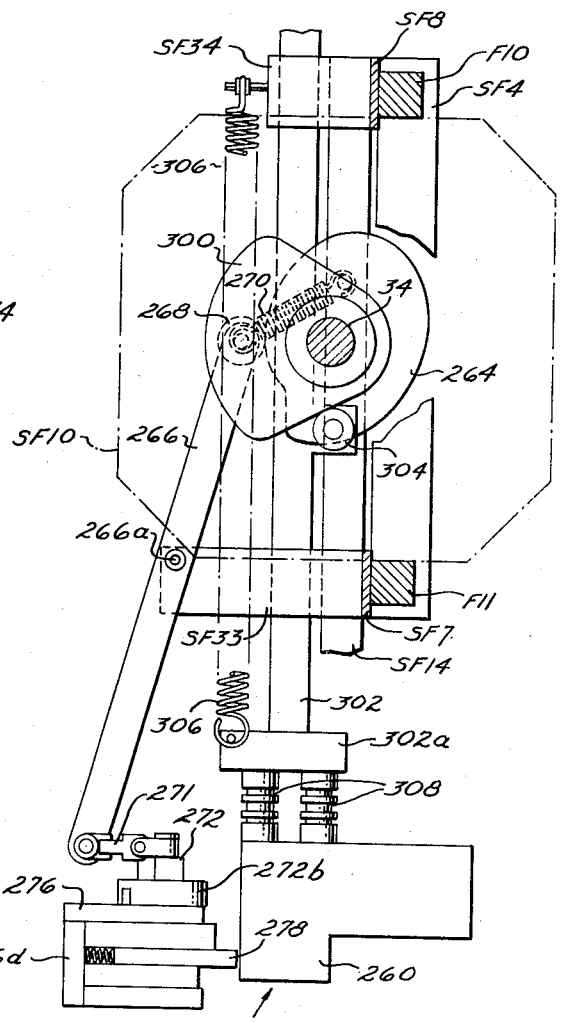
Fig. 22 is a transverse sectional view of the drive for the forming and applying assembly taken along the line 22—22 of Fig. 8 with the support plate to the right of said section line shown in dot-dash line.

The vertical movement of the head 260 is caused by a cam 300 rotated by cam shaft 34 in Fig. 22 for reciprocating slide 302 and its head 302a vertically by a roller follower 304 carried by this slide and bearing against the periphery of cam 300 by the resilient bias of spring 306 connected at one end to slide head 302a and at the other end to guide block SF34 secured to subframe member SF8. Slide 302 is mounted for reciprocation in subframe guide block members SF33, SF34 and has secured to its head 302a forming head 260 by insulator members 308 to confine the heat from heaters 262 to the head 260.

Divider member A2 is adhesively secured to receptacle bottom wall 14a as it is applied thereto. The heaters 262 in head 260 soften the heat sensitive adhesive when the divider member is wrapped around the head so that the horizontal leg 24e is adhesively secured to the receptacle surface 14a by the heat sensitive adhesive carried by the outer or bottom surface of this horizontal leg. Hence, the divider member A2 is held in right-angularly bent relationship during and after securement to the bottom surface of the receptacle.

The location and arrangement of the adhesive and non-adhesive surfaces should be carefully noted. Non-adhesive surfaces of the divider member A2 are in contact with the forming surfaces 260a and 260b, the pressing surface 260c, the holding block 278 and the folding arm 284 so that there will be no tendency for the divider member to adhesively secure to any of these surfaces or machine components. The adhesive surfaces between strip widths 55a and 55b is securely held together by the right-angular bend between the divider member elements 24g and 24h around the heating head 260. Therefore, the heat from heaters 262 cannot soften the bond between these overlapped widths made by heat sealing assembly A16. The bond between these overlapped widths will probably be strengthened in view of the heat and pressure between the adhesive bearing surfaces. Outwardly exposed adhesive is found only on the bottom surface of horizontal leg 24e, which adhesive is required to secure the divider member A2 onto the inside surface of the receptacle bottom wall 14a.

Also, the receptacle 14 is preheated before divider member A2 is applied thereto. As conveyor assembly C carries receptacles 14 from left to right in Fig. 7, the receptacles are preheated by heater plate 310 in Figs. 7, 9 and 18 secured to cross bars (not shown) similar to and parallel to conveyor frame cross bars CF6 located below the path of travel of the receptacles and mentioned hereinafter.

A back-up plate 312 is provided in Figs. 9 and 25 below receptacle 14 at station C1 to provide a back-up support against which the head 260 presses the receptacle bottom wall 14a. Plate 312 has secured thereto and downwardly extending therefrom a plurality of rods 314 telescoping through a frame plate member F21 secured to parallel frame plates F22, F22 secured to frame members F6 and F17 in Fig. 9, with the plate 312 normally biased upwardly by compression springs 316 telescoped over the rods 314 and located between plate 312 and frame plate member F21. Lock nuts 317 on rods 314 keep springs 316 always under compression. These springs 316 provide sufficient pressure between back-up plate 312 and head 260 to assure adhesion between the divider member A2 and receptacle bottom wall 14a.

After adhesive securement has been completed, rotation of valve plate 290 in Fig. 8 by cam shaft 34 causes the vacuum to be released and further rotation of cam shaft 34 raises head 260 back to its original or elevated position for receiving the terminal end of the strip during the next strip feeding action.

Alternate constructions readily suggest themselves. First, the heat for softening the adhesive need not be applied by the head 260 but could be applied by any heating means adjacent the divider member in the contacting or applying position of Fig. 25. For example, it could be applied through back-up plate 312 below receptacle 14, but this type of heat application may require slow down of the high speed operation of the machine to provide sufficient heat transfer or may burn the receptacle bottom wall by the higher temperature required for adequate heating in a short time period. In the present disclosure, heat is applied gradually to the divider member as it is wrapped around the head 260 and as the head 260 moves downwardly into applying position on the receptacle 14 so that burning will not occur because an exceedingly high temperature is not needed. Second, the head 260 moves downwardly toward the receptacle 14, but since only relative movement between the two is necessary, the receptacle 14 may move upwardly toward the head. Then, holding block 278 and folding arm 284 may be used alone without the additional vacuum. However, it is believed that the illustrated form is a faster mode of operation and has a simpler construction because no extensive modification of the conveyor assembly C is required.

The second unit B is essentially the same as the first unit A with most assemblies being mirror images of each other. However, the folding action of the divider member B2 about the forming and applying head B260 in Fig. 7 is different and the timing of the cut-off assembly B26 may also be different. These changes are necessitated by the different arrangement and shape of the divider member B2. Holding block B278 and folding arm B284 correspond respectively with holding block 278 and folding arm 284 and are actuated by a similar mechanism. In unit A, timing is critical because holding block 278 must first engage the strip so as to hold the strip after cut-off. Then, cut-off must occur by cut-off assembly A26 before folding arm 284 may fold the cut-off end around the head 260. In unit B, holding block B278 and folding arm B284 may advance to holding and folding positions in any order but preferably with the holding block B278 advancing to its final position first. Cut-off of the member by the cut-off assembly B26 may occur before the completion of, during or after bending the divider member B2 around the head B260 by folding arm B284 as long as holding block B278 securely holds the strip against the head B260. The preferred mode of operation is to have the holding block B278 advance first to hold the terminal end of the strip against the head B260 so that the folding action by arm B284 and the cut-off by cut-off assembly B26 will occur simultaneously or in any desired sequence.

Means is provided for feeding the receptacles 14 to, between, and away from the units A and B and for stopping them at a station at each unit for divider member application. For example, in Fig. 7, unit A can secure divider member A2 at station C1 in one position in receptacle 14 and unit B can secure divider member B2 at station C2 in receptacle 14 with the divider members and stations spaced apart. The resulting construction is a receptacle having a plurality of compartments.

The receptacle conveyor assembly C feeds receptacle 14 to station C1, from station C1 to station C2, and away from station C2. The conveyor assembly construction is shown most clearly in Figs. 7, 8, 9, 18 and 26. The conveyor assembly C includes a frame CF having rigidly interconnected frame members designated by the reference numeral prefix CF. The conveyor assembly frame CF includes vertical posts CF1 and CF2 secured at their lower ends to the floor and arranged in pairs with the pairs spaced along the conveyor. The tops of posts CF1 and CF2 are secured respectively to longitudinal bars CF3 and CF4 running along the length of the conveyor. Bar CF3 is slidably received by frame post F1 in frame guide F20 at the right end of Fig. 8 to permit longitudinal movement of unit A along conveyor assembly C in a manner to be described more in detail hereinafter. Cross bars CF6, spaced along the conveyor length, are connected at opposite ends to longitudinal bar CF3 and longitudinal plate CF7 with said plate secured to vertical post CF2 by a plurality of blocks CF9 located along the length of the conveyor. The conveyor assembly includes channel members 320, 320' oriented parallel to each other and respectively secured to the conveyor frame bar member CF4 and carried by bars CF6. Member 320' is secured by brackets 328a to strip 328 extending longitudinally along the conveyor with a plurality of heads 328b carried by a plurality of cross bars CF6 spaced along the conveyor. Endless belts 324 and 324' each have one run thereof traveling within the channel of members 320 and 320' with the opposite loop ends of each belt supported by pulleys 326 and 326' rotatably mounted about vertical axes on conveyor frame member CF7 and strip 328 with at least one of these pulleys for each of the belts being power driven for advancing the receptacles 14 by friction engagement with the sides thereof from left to right in Fig. 7.

Figure 18:
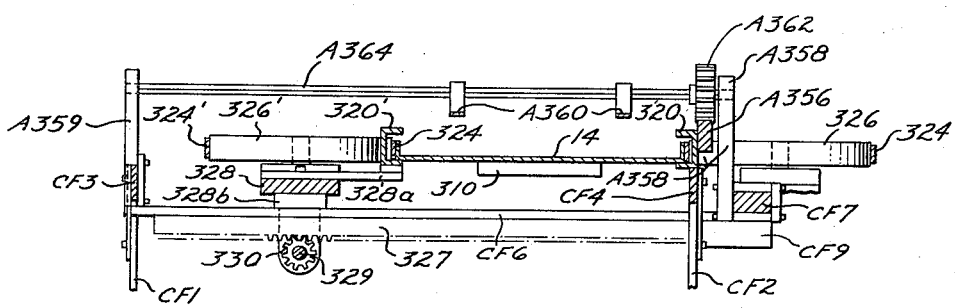
Fig. 18 is a transverse, vertical sectional view taken along the line 18—18 of Fig. 9 through the conveyor assembly.

Different width receptacles require adjustment of the machine. A rack 327 in Fig. 18 is secured to the lower surface of frame bar member CF6. Both pulleys 326' for the belt 324' (only one shown in Fig. 18) and channel member 320' are carried by strip 328 while pulley 326 and channel member 320 are carried in stationary relationship by frame members CF4 and CF7. Since all of these heads 328b on strip 328 are generally identical, only one head 328b in Fig. 18 is described in detail. Head 328b is slidably mounted on frame member CF6 for movement transverse of conveyor assembly C. A common shaft 329 for all of these heads is rotatably mounted in head 328b and has secured thereto a pinion 330 meshing with rack 327 so that upon rotation of common shaft 329 all of these heads move together toward the right or left in Fig. 18 to provide the proper spacing between channel members 320, 320' corresponding to the receptacle width.

Receptacle stop assembly A1 and B1 is provided for stopping each receptacle 14 in timed relationship with unit A and B at station C1 and C2.

A common power drive is provided for the receptacle stop assemblies A1 and B1 and conveyor belts 324 and 324'. Drive shaft 32 in Fig. 26 drives through bevel gears 331 and 332 a cross shaft 334 rotatably mounted in bearing plate CF10 secured to post CF2 so as to drive through gears 336 and 338 a cross shaft 340 rotatably mounted in bearing plates CF11 and CF12 secured respectively to posts CF2 and CF1. Belts 324 and 324' are driven by any suitable drive (not shown) from cross shaft 334 to a pulley of each belt. Each receptacle stop assembly is of similar construction with only the stop assembly A1 described in detail. See Figs. 8, 9, 18, 26 and 27. Stop assembly A1 includes a roller follower A348 in Fig. 27 on the distal end of a lever A350 pivoted at A350a to frame plate member CF11 with follower A348 following the periphery of cam A344 driven by shaft 340. A link A352 is pivotally connected at opposite ends to lever A350 and a reciprocable rack A356 mounted for reciprocation along the length of the conveyor in a guide formed between channel member 320 in Fig. 18 and post member A358 secured to conveyor frame member CF7. A spring A354 in Fig. 27 is secured at opposite ends to conveyor frame member CF6 and link A352 to bias the follower A348 against the periphery of cam A344. The teeth of rack A356 coact with a pinion A362 in Figs. 9, 18 and 27 secured to a cross shaft A364 rotatably mounted on opposite ends in post members A358 and A359 with post member A359 secured at its lower end to bar CF3. One or more rake type hooks A360 are secured to the shaft A364 and oscillate therewith with the distal end thereof adapted to engage the trailing side wall of receptacle 14 in the manner illustrated in Figs. 7 and 27 to provide the stopping action at station C1. Hence, each receptacle is stopped in proper timed sequence with the movement of forming and applying head 260 and then is released after the divider member A2 has been adhesively secured thereto.

The proper timing between each unit and its receptacle stop assembly A1 or A2 is obtained by disengaging the clutch for each by clutch levers 40a or B40a in Figs. 8 and 9. Then, in unit A, for example, hand wheel 42 in Fig. 8 is rotated by hand until the head 260 is synchronized properly with the position of the receptacle stop assembly A1. The indicia on synchronizing dial 50 may be aligned with a reference point on frame member F3 to establish this synchronization with the receptacle stop assembly A1 at any given point in its cycle of operation. After synchronization has been obtained, clutch lever 40a is again manually actuated to reengage the clutch so that synchronization will be maintained.

Figure 1:
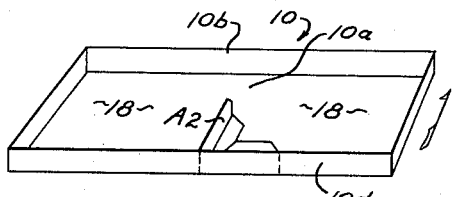
Fig. 1 is a perspective view of one form of two-compartment box or receptacle with the divider member formed and affixed by the present machine.

When divider member A2 is applied in the receptacle 10 or 12 in Figs. 1, 2 or 3, interference may be encountered between stop rakes or hooks A360 and head 260 in Fig. 9 because the divider member A2 is applied closely adjacent the trailing side wall of the receptacle, which is the same side wall engaged by the distal ends of receptacle stop rakes A360. No such problem is encountered by the unit B because the divider members B2 in Figs. 1 and 3 are applied against or adjacent the leading or front side wall as the receptacle moves in the direction of its associated arrow along the length of the conveyor assembly C. When the constructions in Figs. 1, 2 and 3 are being manufactured, alternately usable stop members in Fig. 28 are used in place of stop rakes A360. A cam A374 on cross shaft 340 in Figs. 26 and 28 drives a roller follower A378 on one end of lever A380 pivoted to the conveyor frame plate member CF12 at pivot A380a with the follower A378 being biased against the periphery of cam A374 by spring A384 secured at opposite ends to lever A380 and plate CF12. A link A382 is pivotally connected at opposite ends to one end of lever A380 and to the distal end of arm A390 on a cross shaft A391 rotatably mounted on opposite ends in bars CF3 and CF4 of Fig. 8. A pair of arms A392 serves as an oscillatable receptacle stop engageable in front of receptacle leading side wall 10b, for example, of receptacle 10 and is secured to this cross shaft A391.

A consideration of the structure shown in Figs. 1 to 5 inclusive quickly reveals that, when applying divider members to different size or type receptacles, an adjustment may be required in the location on conveying assembly C of the divider member applying station by moving one or both forming and applying heads A260 and B260 relative to assembly C. The longitudinal and/or the transverse location of each head with respect to the conveyor assembly C may be required to be adjusted in changing from one set-up to another, such as for two different receptacles.

Independent longitudinal adjustment of each head, and with it its unit A or B, along the length of the conveyor C is easily made with both frame F and subframe SF of any one unit moving together as a whole. It has been found easier to change the location of the unit along the length of the conveyor than to change the mode of operation of each receptacle stop assembly A1 or B1 by changing the length of cam stroke or travel of its gear rack. Changing the location of one or both units will still maintain the same length of and end travel positions of stop rakes A360 and B360 as well as the timing between each rack and its associated unit. In Figs. 7 and 8, the units A and B have racks A400, A401 and B400, B401 secured to the floor of the room with pinions A403, A404 and B403, B404 meshing respectively therewith. As the remainder of the construction is identical for unit B, only that for unit A will be described since it is shown most clearly in Fig. 8. In Fig. 8, shafts 406 and 408 are rotatably mounted to frame members F1 and F3 respectively by frame plates F24, F24 and F25, F25 secured to these respective frame members with the shafts having secured to their opposite ends pinion gears A403 and A404 and bevel gears 410 and 412. Bevel gear and chain sprocket units 414 and 416 are rotatably mounted on suitable brackets secured to frame members F1 and F3 and have the bevel gears thereof respectively meshing with the bevel gears 410 and 412. A chain belt 418 is in driving relationship with the sprockets on each of these units so that when hand wheel 420, secured to shaft 408, is rotated, gears A403 and A404 will rotate synchronously to move the unit A lengthwise or longitudinally along the conveyor assembly C with respect to the receptacle stop rake A360 in Fig. 7 by traveling on rollers 420, rotatably mounted on frame members F1, F3 and F4 in Fig. 8 over plates 422 secured to the floor until the desired location for securement of divider member A2 has been reached.

The forming and applying head 260 may also be moved transversely to the travel of conveyor assembly C to locate it in the proper place with respect to the receptacle. In unit A in Fig. 8, subframe SF is movable transversely of the conveyor assembly C and its frame F by rotation of hand wheel 26 in Fig. 8, in the manner mentioned heretofore. A similar construction is provided on unit B for independent movement thereof.

Various changes in details and arrangement of parts can be made by one skilled in the art without departing from either the spirit of this invention or the scope of the appended claims.

What is claimed is:

1. In a receptacle divider member forming and applying machine, means for feeding sheet material from a supply, means for bending said sheet material into the shape of receptacle divider members, means for adhesively securing individually some of said members into receptacles as dividers thereof at a given position, and means for adhesively securing individually some of said members into said receptacles as dividers thereof spaced from said given position, whereby the receptacle is divided into at least two compartments.

2. In a receptacle divider member applying machine, means for conveying a receptacle from one station to another, means for adhesively securing at said station a divider member in one position in said receptacle, means for adhesively securing at said other station another divider member in said receptacle spaced from said one position, and means for stopping said receptacle at each station in timed relationship with said divider member securing means.

3. In a receptacle divider member forming and applying machine, means for slitting transversely one leg of a member L-shape in cross section into two portions, means for bending about a transverse line the other leg of said member at said slit into two angularly disposed elements, means for securing both portions of said one leg to the interior of a flat bottom wall of a receptacle so that said other leg forms a divider therein extending upwardly from said bottom wall with the angular disposition between said elements being maintained.

4. In a receptacle divider member forming and applying machine, means for notching transversely one leg of a member L-shape in cross section into two portions, means for bending about a transverse line the other leg of said member at said slit into two angularly disposed elements, means for securing both portions of said one leg in coplanar relationship to the interior of a flat bottom wall of a receptacle so that said other leg forms a divider therein extending upwardly from said bottom wall with the angular disposition between said elements being maintained.

5. In a receptacle divider member forming and applying machine, means for feeding a continuous strip of material through the machine, means for dividing said strip into at least two widths and forming said strip into an L-shape section by bending one width at right angles to the other in response to the feeding motion, means for slitting transversely one leg of said L-shape in cross section into two portions, means for transversely cutting off a member from the terminal end of said strip with said member including said two portions, means for bending about a transverse line the other leg of said member at said slit into two angularly disposed elements, means for securing both portions of said one leg to the interior of a flat bottom wall of a receptacle so that said other leg forms a divider therein extending upwardly from said bottom wall with the angular disposition between said elements being maintained.

6. In a receptacle divider member forming and applying machine, means for feeding a continuous strip of material through the machine, means for dividing said strip into three widths and forming said strip into an L-shape section by bending one width at right angles to the other two and folding the other two in overlapped relationship in response to the feeding motion so that one width forms one leg and the other two of said widths overlap and form the other leg, means for securing adhesively the overlapped other two widths together, means for slitting transversely said one leg of said L-shape cross section into two portions, means for transversely cutting off a member from the terminal end of said strip with said member including said two portions, means for bending about a transverse line the other leg of said member at said slit into two angularly disposed elements, means for securing adhesively both portions of said one leg to the interior of a flat bottom wall of a receptacle so that said other leg forms a divider therein extending upwardly from said bottom wall with the angular disposition between said elements being maintained.

7. In a receptacle divider member forming and applying machine, means for intermittently feeding a continuous strip of material through the machine with one side of said strip having a heat sensitive adhesive material thereon, means for dividing said strip into three widths and forming said strip into an L-shape section by bending one width at right angles to the other two and folding the other two in overlapped relationship in response to the feeding motion so that one width forms one leg and the other two of said widths overlap and form the other leg, means operable during non-feeding for securing adhesively the overlapped other two widths together by applying heat and pressure thereto, means for slitting transversely said one leg of said L-shape cross section into two portions, means for transversely cutting off a member from the terminal end of said strip with said member including two portions, means for bending about a transverse line the other leg of said member at said slit into two angularly disposed elements, means for securing adhesively by heat and pressure both portions of said one leg to the interior of a flat bottom wall of a receptacle so that said other leg forms a divider therein extending upwardly from said bottom wall with the angular disposition between said elements being maintained.

8. In combination, means for applying a member to an article, means for conveying an article to an applying station and away from said station, and means for moving said applying means longitudinally relative to the path of article travel by said conveying means to change the location of said applying station on said conveying means.

9. In combination, two units with each unit forming a divider member from a sheet supply and applying said member to an article, means for conveying an article to an applying station at one of said units, to an applying station at the other of said units, and away from said station at said other unit, and means for moving said units independently, transversely and longitudinally relative to the path of article travel by said conveying means to change the location of said applying stations on said conveying means.

10. In a receptacle divider member forming and applying machine, means for intermittently feeding a continuous strip of material from a supply through the machine with one side of said strip having a heat sensitive adhesive material thereon and the other side being free of said adhesive to form respectively adhesive and non-adhesive sides, means for dividing said strip longitudinally into three widths and forming said strip into an L-shape section by bending one width at right angles to the other two and folding longitudinally the other two widths in overlapped relationship with said adhesive material therebetween in response to the feeding motion so that one width forms one leg and the other two of said widths overlap and form the other leg, means operable during non-feeding for securing adhesively the overlapped other two widths together by applying heat and pressure thereto, said last mentioned means including heating heads located astride said two overlapped widths for sealing them together and including means for simultaneously advancing said heads into strip contact for heat sealing said overlapped widths together during non-feeding and for retracting said heads to permit feeding, means for notching transversely said one leg of said L-shape cross section into two portions, means for transversely cutting off a member from the terminal end of said strip with said member including said two portions, means for transversely scoring said other leg at said notch to form a transverse bend line at said notch to divide said member after cut-off into two elements, with each including one of said portions, and means for bending about said transverse line in the plane of said one leg the other leg of said member at said notch into two right angularly disposed elements, for causing relative approach movement between said member and article, and for applying and then securing adhesively by heat and pressure both portions of said one leg in coplanar relationship to the interior of a flat bottom wall of a receptacle so that said other leg retains its bent form and forms a divider therein extending upwardly from said bottom wall with the right angular disposition between said elements being maintained; said last mentioned means including a heated forming head having two member forming surfaces right angularly disposed respectively on two side surfaces of said head and having a pressing surface right angularly disposed with respect to each forming surface, including pressing means for pushing the other leg of one of said elements against one forming surface of said head after strip feeding to hold said member during cut-off with said one leg of said one element having some of one of its portions adjacent said notch underlying said pressing surface with said non-adhesive side against said pressing means and head surfaces, including bending means for bending the other of said elements right angularly at said transverse score around said head with said other leg of said other element against said other forming surface and some of the other portion on said one leg of said other element adjacent said notch underlying said pressing surface and with said non-adhesive side against said bending means and head surfaces, including means responsive to actuation of said sheet bending means after completion of bending for applying through said head a vacuum through holes in said surfaces to hold said member in conformity with said head upon release of said pressing and bending means, including means for withdrawing and releasing said pressing and bending means, and including means for causing movement of said head with said pressing surface moving toward said receptacle so that the adhesive coated side of said one leg portions are applied to and are adhesively secured to said receptacle by said heated head.

11. A receptacle divider member applying machine, comprising means for conveying a receptacle from one station to another, means for preheating said receptacle as it approaches said stations, two divider member forming and securing units with one unit securing at said one station one divider member in one position in said receptacle and the other unit securing at said other station another divider member in said receptacle spaced from said one position, means for stopping said receptacle in timed relationship with said units at said stations, and means for moving said units independently, transversely and longitudinally relative to the path of receptacle travel by said conveying means to change said applying stations on said conveying means; each of said units including means for intermittently feeding a continuous strip of material from a supply through the machine with one side of said strip having a heat sensitive adhesive material thereon and the other side being free of said adhesive, to form respectively adhesive and non-adhesive sides, means for dividing said strip longitudinally into three widths and forming said strip into an L-shape section by bending one width at right angles to the other two and folding longitudinally the other two widths in overlapped relationship with said adhesive material therebetween in response to the feeding motion so that one width forms one leg and the other two of said widths overlap and form the other leg, means operable during non-feeding for securing adhesively the overlapped other two widths together by applying heat and pressure thereto, said last mentioned means including heating heads located astride said two overlapped widths for sealing them together and including means for simultaneously advancing said heads into strip contact for heat sealing said overlapped widths together during non-feeding and for retracting said heads to permit feeding, means for notching transversely said one leg of said L-shape cross section into two portions, means for transversely cutting off a member from the terminal end of said strip with said member including said two portions, means for transversely scoring said other leg at said notch to form a transverse bend line at said notch to divide said member after cut-off into two elements, with each including one of said portions, and means for bending in the plane of said one leg about said transverse line the other leg of said member at said notch into two right angularly disposed elements, for causing relative approach movement between said member and article, and for applying and then securing adhesively by heat and pressure both portions of said one leg in coplanar relationship to the interior of a flat bottom wall of a receptacle so that said other leg retains its bent form and forms a divider therein extending upwardly from said bottom wall with the right angular disposition between said elements being maintained; said last mentioned means including a heated forming head having two member forming surfaces right angularly disposed respectively on two side surfaces of said head and having a pressing surface right angularly disposed with respect to each forming surface, including pressing means for pushing the other leg of one of said elements against one forming surface of said head after strip feeding to hold said member during cut-off with said one leg of said one element having some of one of its portions adjacent said notch underlying said pressing surface with said non-adhesive side against said pressing means and head surfaces, including bending means for bending the other of said elements right angularly at said transverse score around said head with said other leg of said other element against said other forming surface and some of the other portion on said one leg of said other element adjacent said notch underlying said pressing surface and with said non-adhesive side against said bending means and head surfaces, including means responsive to actuation of said sheet bending means after completion of bending for applying through said head a vacuum through holes in said surfaces to hold said member in conformity with said head upon release of said pressing and bending means, including means for withdrawing and releasing said pressing and bending means, and including means for causing movement of said head with said pressing surface moving toward said receptacle so that the adhesive coated side of said one leg portions are applied to and are adhesively secured to said receptacle by said heated head.

12. In a receptable divider member forming and applying machine, means for intermittently feeding a continuous strip of material from a material supply through the machine to define a terminal end thereof with one side of said strip having a heat sensitive adhesive material thereon and the other side being free of said adhesive material to form respectively adhesive and non-adhesive sides, means for dividing said strip longitudinally into a plurality of widths, means for bending at least one of said widths at an oblique angle longitudinally of said strip so that said one width forms one leg and the remaining part of said strip forms at least one other leg, means operable during non-feeding of said strip for securing adhesively the sides of said strip together by applying heat and pressure thereto, said last mentioned means including heating heads located astride said strip and having means for simultaneously advancing said heads into contact with said strip for heat sealing the same during non-feeding and for retracting said heads to permit feeding of said strip, means for notching transversely said one leg of said strip to define two portions thereon, means for separating said terminal end from said strip so as to include said two legs, means for transversely scoring said other leg intermediate said two portions to form a transverse bend line, and means for bending said other leg at said bend line to form two angularly disposed parts.

13. A machine for forming and applying a divided member to a receptacle, comprising conveyor means for conveying a receptacle to and from a plurality of stations, means for preheating said receptacle as it approaches said stations, a divider member forming and securing unit at each of said stations and operable to place and secure a divider member in a predetermined position in said receptacle, means for stopping said receptacle at said stations in timed relation with said units, means for moving said units relative to said conveyor means independently effective to locate said units at said stations in a predetermined position relative to said receptacle; each of said units comprising means for feeding a continuous strip of material from a material supply through the machine to define a terminal end thereof with one side of said strip having a heat sensitive adhesive material thereon and the opposing side of said strip being free of said adhesive material to form respectively adhesive and non-adhesive sides, means for dividing said strip into a plurality of widths extending longitudinally of said terminal end, means for bending at least one width at an oblique angle to form one leg and the remaining part of said strip to form at least one other leg, means for notching transversely said one leg of said strip into two portions, means for separating said terminal end from said strip to define said divider member so as to include said two legs, means for scoring said other leg intermediate said leg portions to form a transverse bend line, and means for bending said other leg at said bend line to form two angularly disposed parts in the plane of said one leg, said last named means being thereafter actuatable to adhesively secure said member in said receptacle.

14. A machine for forming and applying a divided member to a receptacle, comprising conveyor means for conveying a receptacle to and from a plurality of stations, means for preheating said receptacle as it approaches said stations, a divided member forming and securing unit at each of said stations and operable to place and secure a divider member in a predetermined position in said receptacle, means for stopping said receptacle at said stations in timed relation with said units, means for moving said units relative to said conveyor means independently effective to locate said units at said stations in a predetermined position relative to said receptacle; each of said units comprising means for feeding a continuous strip of material from a material supply through the machine to define a terminal end thereof with one side of said strip having a heat sensitive adhesive material thereon and the opposing side of said strip being free of said adhesive material to form respectively adhesive and non-adhesive sides, means for dividing said strip into a plurality of widths extending longitudinally of said terminal end, means for bending at least one width at an oblique angle to form one leg and the remaining part of said strip to form at least one other leg, means operable during non-feeding of said strip for securing adhesively the sides of said strip together by applying heat and pressure thereto, said last mentioned means including heating heads located astride said strip and having means for simultaneously advancing said heads into contact with said strip for heat sealing the same during non-feeding and for retracting said heads to permit feeding of said strip, means for notching transversely said one leg of said strip into two portions, means for separating said terminal end from said strip to define said divider member so as to include said two legs, means for scoring said other leg intermediate said leg portions to form a transverse bend line, and means for bending said other leg at said bend line to form two angularly disposed parts in the plane of said one leg, said last named means being thereafter actuatable to adhesively secure said member in said receptacle.

15. In a machine for forming and applying a divider member to a receptacle as defined in claim 13 and wherein drive means is operatively connected to the means for feeding said strip and includes a drivable connection with said feeding means and means for intermittently actuating said drivable connection being effective to cause a step by step advance of said strip through said machine.

16. In a machine for forming and applying a divider member to a receptacle as defined in claim 13 and wherein drive means is provided for driving the strip feeding means and includes rack means, pinion means operatively connected to said rack means, a shaft, cam means carried on said shaft and rotatably actuated by the same, means operatively connected to said cam means and said rack means being actuated by said cam means to impart a reciprocating movement to said rack means and effective to cause an oscillating movement to said pinion means, and means operatively connected with said feeding means and said pinion means being actuatable to transpose said oscillating movement of said pinion means into a uni-directional movement of said feeding means.

17. In a machine for forming and applying a divider member to a receptacle as defined in claim 13 and wherein the means for dividing the material strip into a plurality of longitudinal widths includes a pair of cylindrical rolls rotatably mounted in said machine in substantial parallel spaced relation and conditioned to receive the material strip therebetween, means for rotatably driving said rolls in opposite directions to each other, peripheral groove means formed on at least one of said pair of rolls, and peripheral ridge means formed on at least the other of said pair of rolls and cooperating with said peripheral groove means to form a score line for adjoining widths of said strip.

18. In a machine for forming and applying a divider member to a receptacle as defined in claim 13 and wherein the means for bending at least one width of said strip includes block means mounted on said machine and having forming means engageable with said one width of said strip being actuatable to bend the same to an oblique angle relative to the remaining portion of said strip.

19. In a machine for forming and applying a divider member to a receptacle as defined in claim 13 and wherein the means for notching transversely said one leg of said strip includes a pair of die members mounted in said machine and movable to form a pair of spaced notches on said one leg of said strip.

20. In a machine for forming and applying a divider member to a receptacle as defined in claim 13 and wherein the means for operating the terminal end from said strip includes blade means slidably mounted on said machine and movable into cutting engagement with said terminal end of said strip and anvil means fixedly supported on said machine and cooperating with said blade means to separate said terminal end from said strip.

21. In a machine for forming and applying a divider member to a receptacle as defined in claim 13 and wherein the scoring means for forming the transverse bend line intermediate the leg portions on said other leg includes a scoring head slidably mounted on said machine and movable into pressure engagement with said other leg of said strip and anvil means cooperating with said scoring head to press said one leg therebetween.

22. In a machine for forming and applying a divided member to a receptacle as defined in claim 13, and wherein the means for bending the other leg of said member at said bend line includes a bending head having a plurality of angularly disposed bending surfaces, said bending head being mounted on said machine and movable into juxtaposition with said other leg and an arm member mounted on said machine and movable into engagement with and to bend said other leg around at least one of said bending head surfaces.

References Cited in the file of this patent

UNITED STATES PATENTS

| Number | Name | Date |
|---|---|---|
| Re. 23,668 | Von Hofe | June 16, 1953 |
| 1,752,139 | Anderson | Mar. 25, 1930 |
| 1,913,655 | Benoit | June 13, 1933 |
| 2,175,618 | Ridderstrom | Oct. 10, 1939 |
| 2,240,445 | Thaxton | Apr. 29, 1941 |
| 2,326,931 | Dalton et al. | Aug. 17, 1943 |
| 2,549,800 | George | Apr. 24, 1951 |
| 2,640,644 | Hennessey et al. | June 2, 1953 |
| 2,706,935 | Pasjack | Apr. 26, 1955 |
| 2,723,602 | Schroeder | Nov. 15, 1955 |
| 2,754,731 | Shields | July 17, 1956 |
| 2,767,625 | Schroeder | Oct. 23, 1956 |
| 2,802,406 | Lindsay | Aug. 13, 1957 |
| 2,849,933 | Von Hofe | Sept. 2, 1958 |